US011457682B2

(12) United States Patent
Massey et al.

(10) Patent No.: US 11,457,682 B2
(45) Date of Patent: Oct. 4, 2022

(54) BAFFLE CONSTRUCTS FOR INSULATIVE FILL MATERIALS

(71) Applicant: The North Face Apparel Corp., Wilmington, DE (US)

(72) Inventors: Ryan Taylor Massey, Oakland, CA (US); Cory Michael Olson, Alameda, CA (US)

(73) Assignee: The North Face Apparel Corp., Wilmington, DE (US)

( * ) Notice: Subject to any disclaimer, the term of this patent is extended or adjusted under 35 U.S.C. 154(b) by 1337 days.

(21) Appl. No.: 15/125,925

(22) PCT Filed: Feb. 29, 2016

(86) PCT No.: PCT/US2016/020118
§ 371 (c)(1),
(2) Date: Sep. 13, 2016

(87) PCT Pub. No.: WO2016/175917
PCT Pub. Date: Nov. 3, 2016

(65) Prior Publication Data
US 2017/0172240 A1    Jun. 22, 2017

Related U.S. Application Data

(60) Provisional application No. 62/155,441, filed on Apr. 30, 2015.

(51) Int. Cl.
*A41D 31/00* (2019.01)
*B32B 5/06* (2006.01)
(Continued)

(52) U.S. Cl.
CPC .......... *A41D 31/185* (2019.02); *A41D 31/04* (2019.02); *A41D 31/065* (2019.02);
(Continued)

(58) Field of Classification Search
CPC .......... D03D 11/02; D03D 11/00; D03D 3/02; D03D 23/00; D03D 25/05; D01B 2403/0333; D01B 2501/04; A41D 13/0058
See application file for complete search history.

(56) References Cited

U.S. PATENT DOCUMENTS 2,072,152 A    3/1937    Blake et al.
2,357,164 A    8/1942    Berg
(Continued)

FOREIGN PATENT DOCUMENTS

CN    201021466    2/2008
CN    201785576    4/2011
(Continued)

OTHER PUBLICATIONS

In't Search Authority/US, International Search Report and Written Opinion for PCT Application No. PCT/US16/20118 dated May 6, 2016, pp. 17.
(Continued)

*Primary Examiner* — Larissa Rowe Emrich
*Assistant Examiner* — Ricardo E Lopez
(74) *Attorney, Agent, or Firm* — Smith, Gambrell & Russell LLP

(57) ABSTRACT

The inventive subject matter generally relates to shaped battle constructs for use in consumer products, such as garments and sleeping bags. In certain aspects, the shaped baffles are arranged in a multi-level construction of baffles wherein the baffles are offset in two or more levels. In certain aspects, the entire construct is a unitary woven, seamless construction.

42 Claims, 11 Drawing Sheets

(51) Int. Cl.
| | | |
|---|---|---|
| *D03D 25/00* | (2006.01) | |
| *B32B 7/08* | (2019.01) | |
| *D03D 11/02* | (2006.01) | |
| *A41D 1/02* | (2006.01) | |
| *B32B 5/26* | (2006.01) | |
| *A41D 31/18* | (2019.01) | |
| *B32B 3/28* | (2006.01) | |
| *B32B 7/05* | (2019.01) | |
| *A41D 31/06* | (2019.01) | |
| *A41D 31/102* | (2019.01) | |
| *A41D 31/12* | (2019.01) | |
| *A41D 31/04* | (2019.01) | |
| *A47G 9/08* | (2006.01) | |
| *D03D 1/00* | (2006.01) | |

(52) U.S. Cl.
CPC ......... *A41D 31/102* (2019.02); *A41D 31/125* (2019.02); *B32B 3/28* (2013.01); *B32B 5/06* (2013.01); *B32B 5/26* (2013.01); *B32B 7/05* (2019.01); *D03D 11/02* (2013.01); *D03D 25/005* (2013.01); *A47G 9/086* (2013.01); *B32B 2262/00* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/04* (2013.01); *B32B 2262/06* (2013.01); *B32B 2262/08* (2013.01); *B32B 2266/00* (2013.01); *B32B 2307/30* (2013.01); *B32B 2307/304* (2013.01); *B32B 2307/51* (2013.01); *B32B 2307/554* (2013.01); *B32B 2307/558* (2013.01); *B32B 2307/581* (2013.01); *B32B 2307/5825* (2013.01); *B32B 2307/712* (2013.01); *B32B 2307/724* (2013.01); *B32B 2437/00* (2013.01); *D03D 1/00* (2013.01)

(56) References Cited

U.S. PATENT DOCUMENTS

| | | | |
|---|---|---|---|
| 2,607,104 | A | 8/1952 | Foster |
| 2,831,198 | A | 4/1958 | Datlof |
| 3,090,406 | A | 2/1963 | Campman et al. |
| 3,966,522 | A | 6/1976 | Hatch et al. |
| 4,635,301 | A | 1/1987 | Sulser |
| 4,649,573 | A | 3/1987 | Yen |
| 4,668,545 | A | 5/1987 | Lowe |
| 5,604,997 | A | 2/1997 | Dieter |
| 5,785,094 | A | 7/1998 | Yoshida |
| 6,000,442 | A | 12/1999 | Busgen |
| 6,047,406 | A | 4/2000 | Dicker |
| 6,299,962 | B1 | 10/2001 | Davis et al. |
| 6,401,497 | B1 | 6/2002 | Nishiyama et al. |
| 6,418,973 | B1 | 7/2002 | Cox et al. |
| 6,837,274 | B2 | 1/2005 | Debaes et al. |
| 7,437,774 | B2 | 10/2008 | Baron et al. |
| 7,568,298 | B2 | 8/2009 | Kems |
| 7,637,032 | B2 | 12/2009 | Sokolowski et al. |
| 7,836,917 | B1 | 11/2010 | Osborne |
| 7,836,918 | B1 | 11/2010 | Osborne |
| 7,841,369 | B1 | 11/2010 | Osborne |
| 7,960,298 | B2 | 6/2011 | Goering |
| 8,333,221 | B2 | 12/2012 | Ly |
| 8,814,429 | B2 | 8/2014 | Roether et al. |
| 2002/0056484 | A1 | 5/2002 | Uchida et al. |
| 2002/0137412 | A1 | 9/2002 | Grilliot et al. |
| 2003/0111127 | A1 | 6/2003 | Kikuchi |
| 2005/0204449 | A1 | 9/2005 | Baron et al. |
| 2006/0179539 | A1 | 8/2006 | Harber |
| 2006/0277950 | A1 | 12/2006 | Rock |
| 2007/0034277 | A1 | 2/2007 | Takai |
| 2009/0068908 | A1 | 3/2009 | Hinchcliff |
| 2009/0126413 | A1 | 5/2009 | Sorensen et al. |
| 2009/0126823 | A1 | 5/2009 | Yengkhom |
| 2010/0086730 | A1 | 4/2010 | Lo et al. |
| 2011/0070412 | A1 | 3/2011 | Ly |
| 2012/0037263 | A1 | 2/2012 | Malloy |
| 2013/0014317 | A1 | 1/2013 | Ly |
| 2013/0019987 | A1 | 1/2013 | Beauduin |
| 2013/0047467 | A1 | 2/2013 | Roether et al. |
| 2013/0051706 | A1* | 2/2013 | Roether ............... A43B 23/024 383/37 |
| 2013/0051712 | A1 | 2/2013 | Roether et al. |
| 2013/0177731 | A1* | 7/2013 | Moriarty ................ B32B 27/12 428/74 |
| 2013/0186506 | A1 | 7/2013 | Cross et al. |
| 2013/0190917 | A1 | 7/2013 | Cross et al. |
| 2013/0217288 | A1 | 8/2013 | Martin et al. |
| 2013/0260104 | A1 | 10/2013 | Dua et al. |
| 2013/0309929 | A1 | 11/2013 | Ly |
| 2014/0237854 | A1 | 8/2014 | Fallon |
| 2014/0250575 | A1 | 9/2014 | Man |
| 2015/0201683 | A1* | 7/2015 | Maud ................... A41D 13/002 428/72 |
| 2016/0281273 | A1* | 9/2016 | Candrian-Bell ..... D06N 3/0006 |

FOREIGN PATENT DOCUMENTS

| | | |
|---|---|---|
| CN | 101660237 | 11/2011 |
| CN | 102630259 A | 8/2012 |
| CN | 104250873 | 12/2014 |
| CN | 204039617 | 12/2014 |
| CN | 105392379 A | 3/2016 |
| CN | 106455732 A | 2/2017 |
| FR | 2095158 A5 | 2/1972 |
| FR | 2847127 A1 | 5/2004 |
| GB | 2 404 669 A | 2/2005 |
| JP | 31-4339 B | 5/1942 |
| JP | 151862 C | 6/1956 |
| JP | S54-128075 | 9/1979 |
| JP | 56-48522 | 5/1981 |
| JP | H09-302503 A | 11/1997 |
| JP | 2001-234446 A | 8/2001 |
| JP | 2005087611 A | 4/2005 |
| JP | 2008121157 A | 5/2008 |
| JP | 2011-202295 A | 10/2011 |
| JP | 2013-155452 A | 8/2013 |
| JP | 2016-191163 A | 11/2016 |
| NL | 7216519 | 6/1973 |
| TW | M452973 | 5/2013 |
| TW | 201700807 A | 1/2017 |
| WO | 9118542 | 12/1991 |
| WO | WO2011034683 A2 | 3/2011 |
| WO | WO02100200 A2 | 12/2012 |
| WO | WO2013148244 A1 | 10/2013 |
| WO | 2015/171363 A1 | 11/2015 |
| WO | 2016/175917 A1 | 11/2016 |

OTHER PUBLICATIONS

Second Office Action in Chinese Application No. 201680001266.5, dated Jul. 3, 2018, with machine English Translation, office action and translation totaling 43 pages.

Final Rejection in Korean Application No. 10-2016-7024834, dated Jul. 12, 2018, with machine English Translation, final rejection and translation totaling 5 pages.

Final Rejection with English Translation in Korean Application No. 10-2016-7024834, dated Mar. 23, 2018, 6 pages.

Decision of Rejection with English Translation for Japanese Application No. 2016-559542, dated Feb. 13, 2018, 16 pages.

Regenold. Future Gear! Peek Inside The North Face Products Lab. Gear Junkie. Oct. 24, 2013. http://gearjunkie.com/future-gear-the-north-face.

Glenn. Two Performance Properties Woven into One Fabric. Outdoor USA Magazine. p. 16. Feb. 2014.

KIPO Office Action dated Feb. 1, 2017 in Korean Patent Application No. 10-2016-7024834.

Harada et al. XP002715732. Textile for clothing such as bodysuit, girdle, leotard, shorts, brassiere, leggings, tights for sports, innerwear

(56) References Cited

OTHER PUBLICATIONS for sports, socks and swimming suits, has preset permeability and textile strength of high permeability region. vol. 2008, Nr:64. Accessed Jan. 23, 2014.

International Preliminary Report on Patentability for PCT Application No. PCT/US2016/020118 dated Oct. 31, 2017, 10 pages.

Second Preliminary Rejection in Korean Application No. 10-2016-7024834, dated Nov. 14, 2017, 6 pages.

Office Action with English Machine Translation in Chinese Application No. 2016800012665, dated Mar. 5, 2019, 45 pages.

Extended European Search Report in European Application No. 16770670, dated Mar. 8, 2019, 8 pages.

Third-Party Submission in European Application No. 16770670, dated Feb. 21, 2019, 76 pages.

Zhang, et al., "On the Design of Reinforced Structure Composites for multilayer Woven Fabric," Journal of Northwest Institute of Textile Science and Technology, Jun. 1999, vol. 13, No. 2 (See English Abstract).

Office Action from Taiwan Application No. 105106462, dated Jan. 23, 2019, 16 pages.

Chinese Office Action with English Summary in Chinese Application No. 201680001266.5, dated Sep. 2, 2019, 30 pages.

Japanese Office Action with English Summary in Japanese Divisional Application No. 2018-113537, dated Sep. 3, 2019, 16 pages.

Taiwan Office Action in Taiwan Divisional Application No. 108114253, dated Apr. 23, 2020, 21 pages.

"Downproofness vs. Air Permeability," IDFL, Publised on Jan. 8, 2008, accessed at http://www.idfl.com/media/pdfs/IDFL%20Downproof%20vs%20Air%20Permeability.pdf, accessed on Sep. 15, 2017, p. 1.

First Office Action forTaiwan Patent Application No. 105106462, dated Apr. 21, 2017.

English-language translation of Notification of Reasons for Refusal for Japanese Patent Application No. 2016-0559542, dated Jul. 11, 2017.

English-language translation of First Office Action for Chinese Patent Application No. 201680001266.5, dated Aug. 30, 2017.

\* cited by examiner

BAFFLE CONSTRUCTS FOR INSULATIVE FILL MATERIALS

BACKGROUND

The present invention relates to fabrics for thermal insulation, such as those used in outerwear garments, sleeping bags, and other articles. Products such as jackets and other garments are often formed from multi-layered constructions made up of a plurality of fabrics. Often, pieces of material commonly referred to as baffles separate the various layers of the construction from one another. For example, these baffles may be provided between the two outer-most layers of a construction to create air chambers, into which an insulative loose fill material, such as natural or synthetic down may be added. These baffles are constructs sewn together from different pieces—top layer, bottom layer and divider walls, which process creates inefficiency in manufacturing. They have simple shapes such as a rectangular profile in order to facilitate ease of manufacturing and placement. FIG. 1A shows an example of a conventional baffle. The baffle stitch lines where top and bottom layer are stitched together, compressing the baffle and excluding the insulative material. These compressed areas with interrupted fill result in cold spots because there is (1) reduced or no fill material and (2) increased air permeability because of the needle penetrations made in stitching the layers. FIG. 1B shows another example of conventional baffling where the baffles are arranged to allow for more uniform distribution of fill along the construct still the disadvantages of stitched seams to connect top and bottom layers and the pieces that form the dividing walls. See also US Publication 20130014317. FIG. 1C shows a baffling system disclosed in US Publication 20140250575. The '575 publication disclosed that multiple distinct layers, which are separately formed, may be arranged in layer sets. The layers of each layer set may be quilt-stitched to each other. An oval space between the layers of each layer has a thermal insulation material. The layer sets are offset from each other, and the stitches of one layer are covered by the area of another layer to block flow of cold air. However, the stitched seams in the prior art remain the source of cold spots in the foregoing constructions. See also US Publication 20130309929, which is directed to a multilayer fabric structure having an insulating interlayer of non-woven fabric (i.e., not loose fill material like down) that is constructed to enhance the insulating capabilities.

The foregoing known baffles are constructed of multiple pieces formed in different weaving operations, creating manufacturing inefficiency and added costs. While bonded joints could be used to join materials, the bonding process remains labor and material intensive. The stitched or bonded seams also are vulnerable to damage because the threads at stitched seams can come loose or bonded joints can separate. Using bonded or stitching also adds weight to products.

In short, conventional baffles have the foregoing and other disadvantages, and there is a need for improved multi-layered baffle constructions that allow for uniform fill distribution, elimination of cold spots, additional strength and integrity, design flexibility, and/or lower costs.

SUMMARY

The inventive subject matter generally relates to shaped baffle constructs for use in consumer products, such as garments and sleeping bags. In certain aspects, the shaped baffles are arranged in a multi-level construction of baffles wherein the baffles are offset in two or more levels. In certain aspects, the entire construct is a unitary woven, seamless construction.

In certain embodiments, the inventive subject matter is directed to a baffle construct, comprising: a multilayer construction of a first layer, one or more interlayers, and a third layer, the layers all being part of unitary, seamlessly woven fabric construct, the layers being joined so as to define a plurality of baffles, the baffles being expandable from a first collapsed configuration to a second expanded configuration, the theoretical longitudinal cross-sectional profile of the baffles in the expanded configuration being an oval-like or elliptical-like form. The baffles may have other shapes in other embodiments.

In certain embodiments, the inventive subject matter is directed to a baffle construct, comprising: a three layer construction of a first layer, a second interlayer below the first layer, and a third layer below the interlayer, the layers all being party of unitary, seamlessly woven fabric construct, the layers being joined so as to define at least four expandable baffles, the baffles being expandable from a first collapsed configuration to a second expanded configuration; the baffle construct having a theoretical longitudinal cross-sectional profile such that the first, second, and third layers each an undulating or sinusoidal form, with the first layer and third layer generally being in phase with each other, and the interlayer being out of phase by about 180 degrees; the first and third layers, the minima or troughs of the first layer merging with maxima or peaks of the interlayer to form joints, and the maxima or peaks of the second layer merging with minima or troughs of the interlayer to form joints; and wherein the first, second, and third layers are disconnected between the joints so as to define the expandable baffles.

In other embodiments, the inventive subject matter is directed to a baffle construct, comprising: a drapable, pliable multilayer construction of a first layer, one or more interlayers, and a third layer, the one or more interlayers being disposed between the first and third layers, the layers all being part of a unitary, seamlessly woven fabric construct, the layers being joined so as to define a plurality of baffles, the baffles being expandable from a first collapsed configuration to a second expanded configuration, wherein the baffle construct has a flat form when in the first collapsed configuration, with the first layer being adjacent one side of the interlayer and the third layer being adjacent to an opposite side of the interlayer, the layers being disconnected from one another except at spaced apart joints at (i) a top side of the interlayer where the first layer merges therewith and (ii) at a bottom side of the interlayer where the third layer merges therewith; and wherein the baffles are arranged in a nested configuration along two or more levels.

In a further possible embodiment, the inventive subject matter is directed to a baffle construct, comprising: a drapable, pliable multilayer construction of a first layer, one or more interlayers, and a third layer, the interlayer being disposed between the first and third layers, the layers all being part of a unitary, seamlessly woven fabric construct, the layers being joined so as to define a plurality of baffles, and wherein the baffles are expandable from a first collapsed configuration to a second expanded configuration; and wherein one of the layers has an overall yarn density that varies from the overall yarn density of another layer.

In another possible embodiment, the inventive subject matter is directed to a baffle construct, comprising: a drapable, pliable multilayer construction of a first layer, one or more interlayers, and a third layer, the interlayer being disposed between the first and third layers, the layers all being part of a unitary, seamlessly woven fabric construct, the layers being joined so as to define a plurality of baffles, and wherein the baffles are expandable from a first collapsed configuration to a second expanded configuration; and wherein one of the layers has a majority or major component of yarn size that varies from that of another layer.

In another possible embodiment, the inventive subject matter is directed to a baffle construct, comprising: a drapable, pliable multilayer construction of a first layer, one or more interlayers, and a third layer, the interlayer being disposed between the first and third layers, the layers all being part of a unitary, seamlessly woven fabric construct, the layers being joined so as to define a plurality of baffles, and, wherein the baffles are expandable from a first collapsed configuration to a second expanded configuration; and wherein one of the layers comprises a majority or major component of a yarn material type that varies from that of another layer.

In another possible embodiment, the inventive subject matter is directed to a method of making a baffle construct, comprising: providing a plurality of weft yarns and warp yarns; weaving a drapable, pliable multilayer construction of a first layer, one or more interlayers, and a third layer, the interlayer being disposed between the first and third layers, the layers all being part of a unitary, seamlessly woven fabric construct, the layers being joined so as to define a plurality of baffles, and wherein the baffles are expandable from a first collapsed configuration to a second expanded configuration, the theoretical longitudinal cross-sectional profile of the baffles in the expanded configuration being an oval-like, elliptical-like, or a quadrilateral-like form.

In another possible embodiment, the inventive subject matter is directed to a method of making a baffle construct, comprising: providing a plurality of weft yarns and warp yarns; weaving a drapable, pliable multilayer construction of a first layer, one or more interlayers, and a third layer, the interlayer being disposed between the first and third layers, the layers all being part of a unitary, seamlessly woven fabric construct, the layers being joined so as to define a plurality of baffles, and wherein the baffles are expandable from a first collapsed configuration to a second expanded configuration.

Any of the foregoing methods may further include the step of expanding the baffles and filling them with a fill material and sealing the baffles. Any of the foregoing methods may further include the step of assembling the baffle construct into an end product selected from the group of: garments, sleeping bags, sleeping pads, footwear uppers, gloves, headwear, pillows, cushions, beds, or bed toppings. Any of the foregoing methods may include selectively placing thermoplastic yarns in the construct, and then placing the construct on a form, mold or pattern and heating and setting the construct to the corresponding shape of the form, mold, or pattern. The shape may represent an anatomical body party.

In another possible embodiment, the inventive subject matter is directed to a baffle construct comprising: a drapable, pliable multilayer construction of a first layer, one or more interlayers, and a third layer, the interlayer being disposed between the first and third layers, the layers all being part of a unitary, seamlessly woven fabric construct, the layers being joined so as to define a plurality of baffles, and wherein the baffles are expandable from a first collapsed configuration to a second expanded configuration.

In any of the baffle constructs disclosed herein, at least one layer may be downproof or fiberproof.

In any of the baffle constructs disclosed herein, the majority or major component of yarns in the interlayer may has a higher denier than the majority or major component of yarns in one or both of the first and third layers.

In any of the baffle constructs disclosed herein, the baffle construct of the interlayer may have an overall different density than one or both of the first and third layers.

In any of the baffle constructs disclosed herein, the construct may have selectively varying yarn denier, yarn material, and/or fabric density to provide selective breathability, windproofness, waterproofness, thermal insulation, moisture transport, elasticity, abrasion resistance, cut/tear resistance, anti-compression resistance, increased compressibility, or purely aesthetic features in one layer or zone versus another.

In any of the baffle constructs disclosed herein the baffle construct may have selectively placed thermoplastic yarns, e.g., yarns comprising TPU.

The inventive subject matter is also directed to such baffle constructs filled with a fill material; end-products using the filled baffle constructs, and methods of making and using the baffle constructs.

The foregoing is not intended to be an exhaustive list of embodiments and features of the inventive subject matter. Persons skilled in the art are capable of appreciating other embodiments and features from the following detailed description in conjunction with the drawings. These and other embodiments are described in more detail in the following detailed descriptions and the figures.

The following is a description of various inventive lines under the inventive subject matter. The appended claims, as originally filed in this document, or as subsequently amended, are hereby incorporated into this Summary section as if written directly in.

BRIEF DESCRIPTION OF THE DRAWINGS

The appended figures show embodiments according to the inventive subject matter, unless noted as showing prior art.

DETAILED DESCRIPTION

Figure 1A:
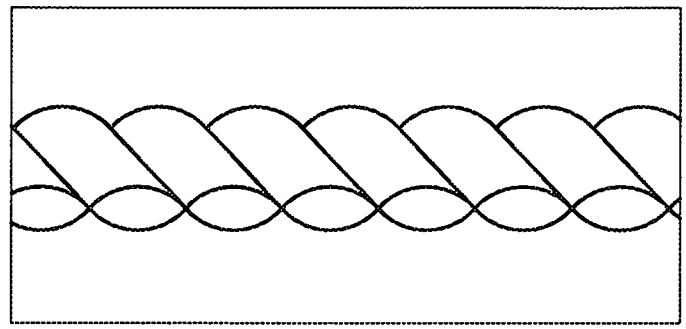
FIG. 1A shows a baffle construction according to the prior art.
Figure 1B:
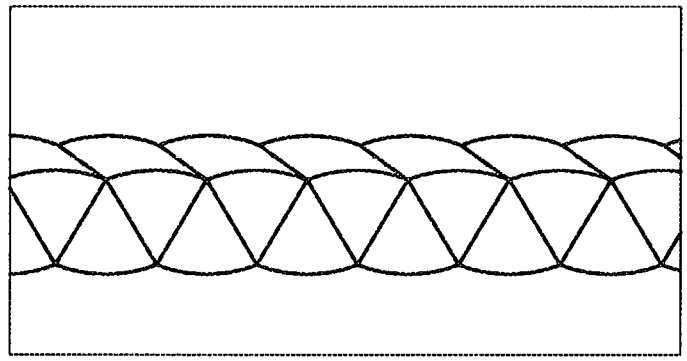
FIG. 1B shows another baffle construction according to the prior art.
Figure 1C:
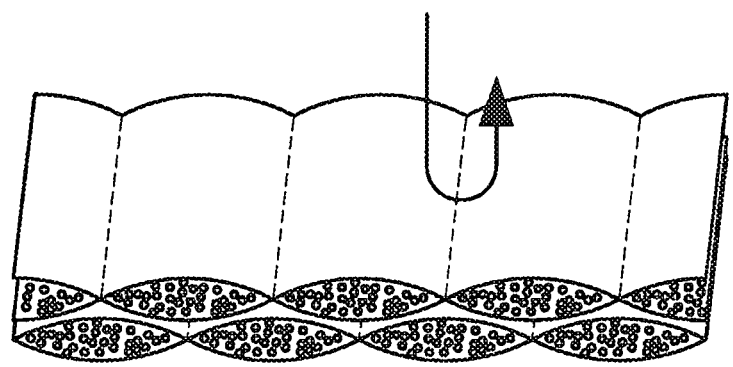
FIG. 1C shows a further baffle construction according to the prior art.

Representative embodiments according to the inventive subject matter are shown in FIGS. 2-15, wherein the same or generally similar features share common reference numerals.

FIGS. 2-7 and 10A-10C show a baffle construct 10 for holding insulation material. The baffle construct may be used in a variety of products, including garments, sleeping bags, sleeping pads, footwear uppers, gloves, headwear, pillows, cushions, beds, bed toppings, and other such objects. The baffle construct is a unitary woven article with different layers seamlessly joined. In other words, all portions are formed in the same weaving process and are not separate panels that are joined together after each is woven.

Baffle construct 10 has a multilayer construction of a first or face layer 12, one or more second or interlayers 14, and a third or back layer 16. The labeling of layers 12, 16 is arbitrary, as either may be deemed one or the other. The labeling will have significance in the context of end products or components for end products: (i) the face layer normally faces outwardly towards the environment, and (ii) the back layer faces inwardly against a substrate, e.g., in the case of a jacket or sleeping bag, the face layer faces away from the user's body and the back layer faces the user's body. Each layer comprises a woven fabric that is a unitary, woven construct, seamlessly formed in weaving process with the other layers.

The layers may have the same or different compositions of yarns or other woven filament. The face layer 12 may be selected to provide desired performance and/or aesthetic attributes. For example, it may be a lightweight material such as taffeta. Or it may be a durable or wear resistant material, such as 40D polyester or ripstop nylon; a weather resistant material that blocks water or wind; an elastic material; or a material that provides a combination of such attributes. The face can be woven in various Dobby patterns.

The back layer 16 may be a comfort material, such as a taffeta; a material that wicks moisture; or a material that provides a combination of such attributes. The interlayer 14 may be the same or different from the other layers, or a combination of materials used in the other layers. The face and/or can have finishes such as DWR for water repellency or CIRE to make the fabric downproof and less air permeable.

In one representative, non-limiting example, face layer 12 has a woven construction such as Dobby, jacquard, etc., to produce a desired weave type (e.g., ripstop, twill, etc.), while the back layer 16 may have a basic taffeta construction. The interlayer 14 may also have a basic taffeta construction like the back layer. Alternatively, it may be like the face layer (e.g., ripstop, twill, etc.).

Various conventional materials with known attributes may be selected to provide desired attributes, such as those listed above, including nylon, polyester, polypropylene, rayon, elastane, silk, cotton, wool, acetate, acrylic, aramid, hemp, jute, lyocell, cashmere, triexta, polyethylene, rayon, and blends of the foregoing, and all recycled versions of any of the foregoing or blends of the foregoing. Deniers for the layers may be 5D or higher, and any layer may be a blend of deniers. For example, deniers of 10D, 15D, 20D, 30D, 40D, 50D, 60D, 70D, 75D, 80D, 90D, 100D, 120D, 140D, 150D, 160D, 180D, or 200D for typical sleeping bag and apparel applications, and a ripstop construction, or other known or discovered Dobby patterns, may be used with any layer to impart additional tear resistance and strength.

A given layer may also have varying attributes in different zones, and there may be transition zones between different zones that allow for a progressive change in attributes, as disclosed in more detail below.

In certain embodiments, the inventive subject matter is directed to a baffle construct having a drapable, pliable multilayer construction of a first layer, one or more interlayers, and a third layer, the interlayer being disposed between the first and third layers. The layers are all part of a unitary, seamlessly woven fabric construct, the layers being joined so as to define a plurality of baffles. In other words, the fabric is a continuously woven so that it is formed in the weaving process as a single, woven piece. The construct comes off the loom in a collapsed, flat form. In such form, the first layer is adjacent to one side of the interlayer and the third layer is adjacent to an opposite side of the interlayer. The layers are disconnected from one another except at spaced apart joints at (i) a top side of the interlayer where the first layer merges therewith and (ii) at the bottom side of the interlayer where the third layer merges therewith. The baffles may be arranged in a nested configuration along two or more levels. In other words, a first line following the longitudinal axis of the construct can generally bisect only the baffles in the first level and a second parallel line following the longitudinal axis of the baffles in the second level can generally bisect only the baffles in that level.

Figure 2:
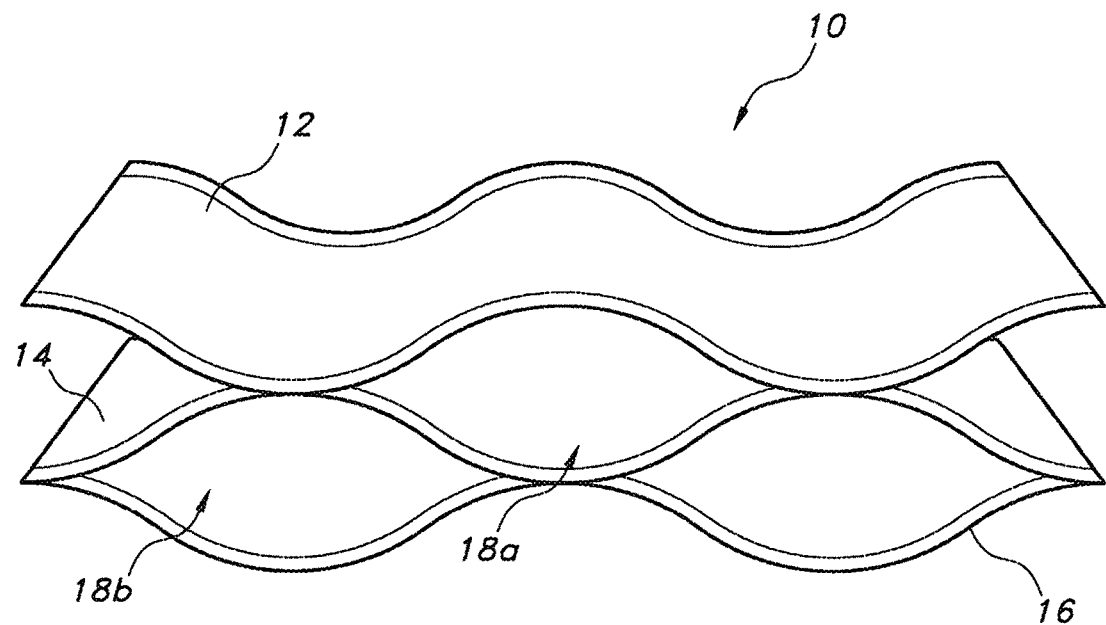
FIG. 2 schematically illustrates a top, side perspective view of a baffle construction having multiple layers before ends of the baffles are closed.
Figure 3:
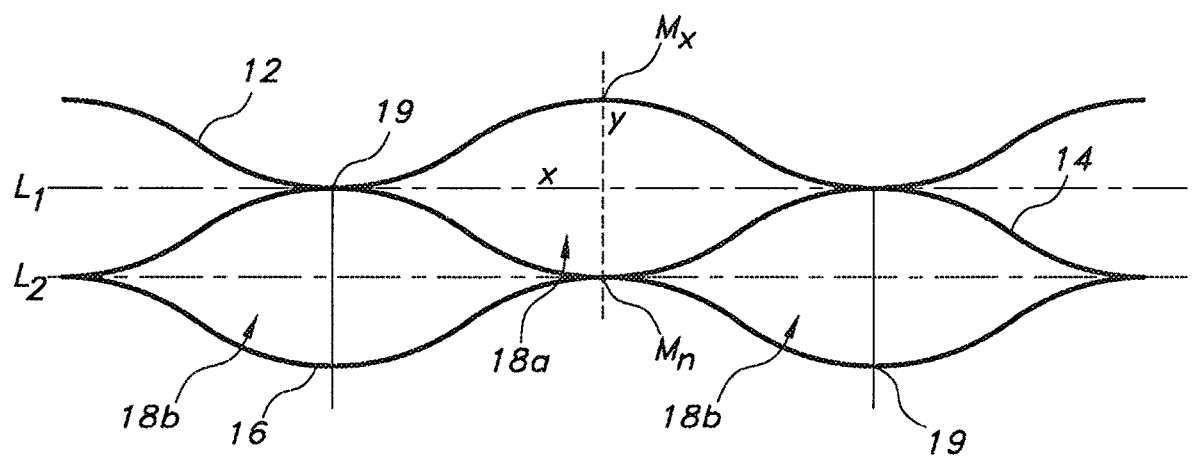
FIG. 3 shows a cross-section of a baffle construction consistent with that of FIG. 1.
Figure 4:
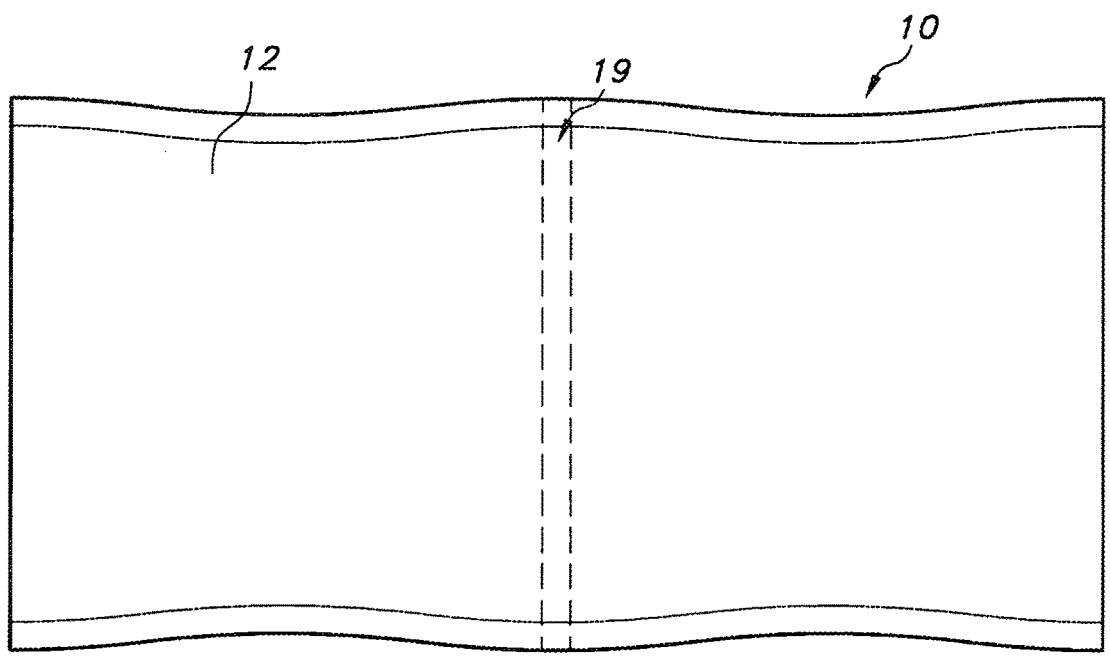
FIG. 4 shows a plan view of the baffle construction of FIG. 1.
Figure 6:
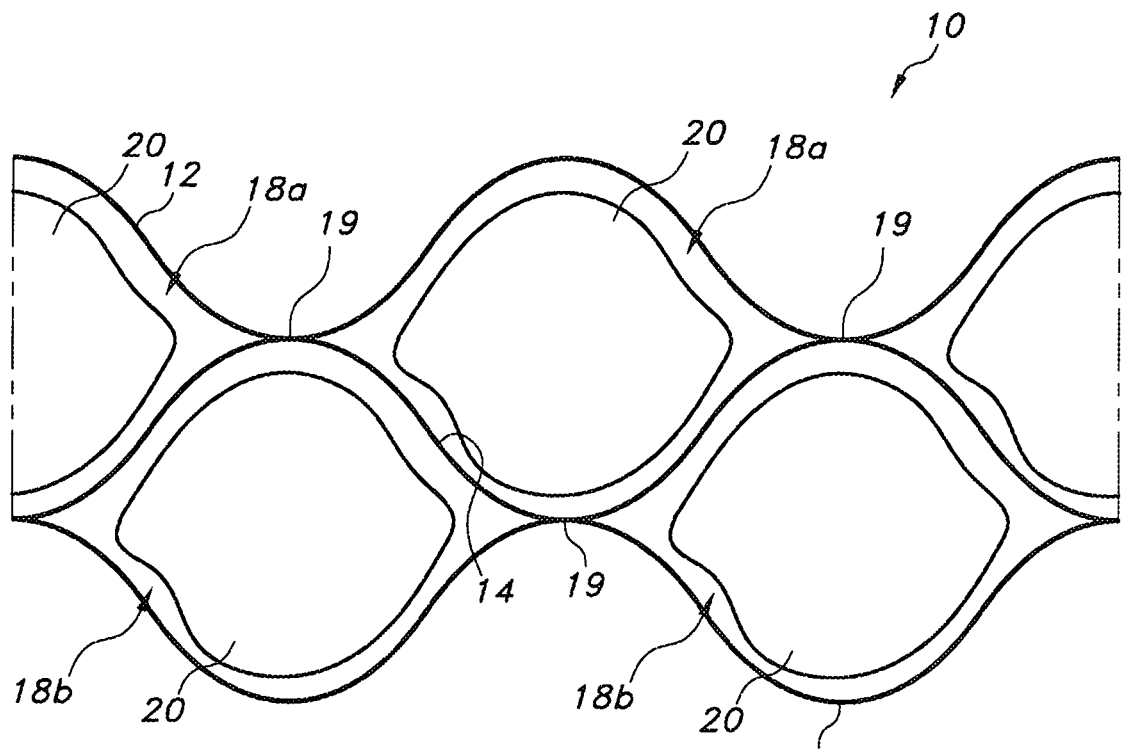
FIG. 6 shows a side perspective view of a baffle construction according to that of FIG. 1 with a fill material in the baffles.
Figure 7:
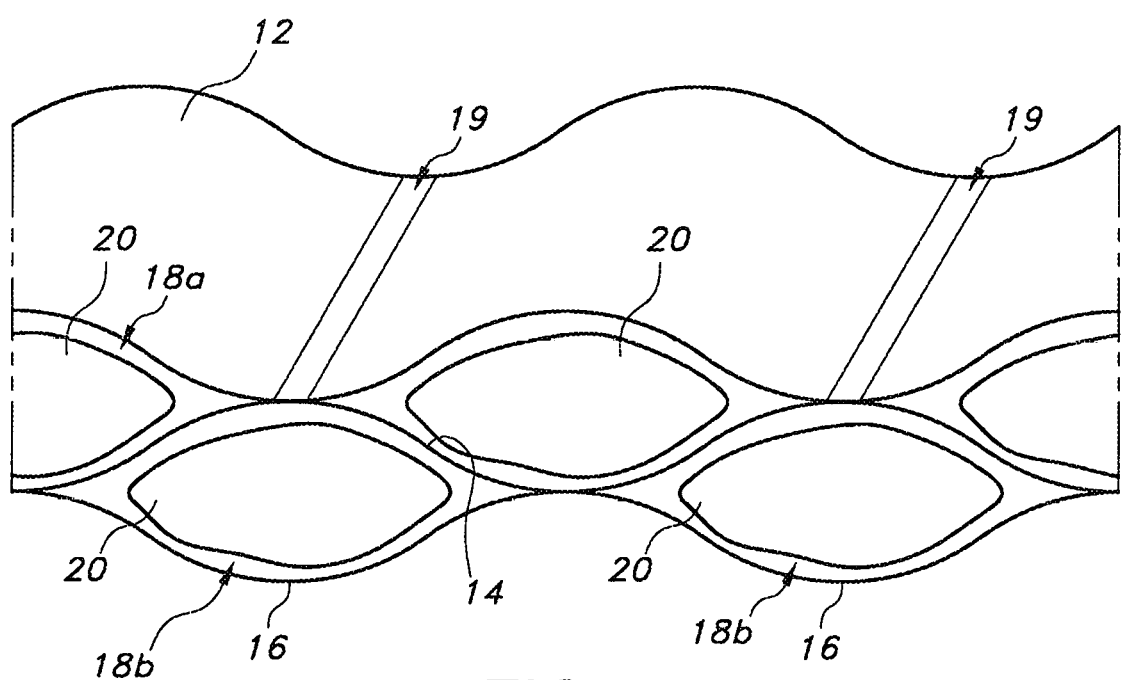
FIG. 7 shows a top perspective view of a baffle construction according to that of FIG. 6.

FIGS. 2-3 show a theoretical shape of the construct 10 when each baffle is filled. Each baffle 18*a-b* has a generally oval-like or elliptical-like cross-sectional profile, following a longitudinal axis (X-axis) of the multi-layer fabric construct. In other embodiments, baffles may have other volumetric shapes like triangles, pentagons, hexagons, or other polygons, circles and other shapes defining a bounded area. In actuality, because of their drapable, pliable, fabric nature, the baffles may have some variation in shape if the baffles are not completely filled or are filled with, for example, clumpy material that does not uniformly distribute within a baffle. Taking the structures shown in the Figures, the variation can be from flat, with no filling in the baffles, to round with overstuffing of the baffles. FIGS. 6-7 show baffles that have fill material and have some variation but nonetheless have a generally oval-like or elliptical shape.

The oval-like structures shown represent an intermediate shape achieved using a non-overstuffed intermediate level of filling. The theoretical shape of the baffles is the volumetric shape that the baffle construct would take in the intermediate shape between flat and overstuffed to a round shape (in the case of the baffles shown). In the case of baffles structured in other shapes, e.g., polygons, as the baffle expands from an expected intermediate shape generally representing or recognizable as a polygon, the corners will curve creating a rounder shape. Another way to view the theoretical shape is to imagine an array of the baffles to be made of an inelastic, air impermeable fabric that was inflated with air until it just reached tautness. This should be the oval-like structure shown. In the following discussion, references to baffle shapes and geometries assume that baffle construct is in its theoretical expanded state unless indicated otherwise.

Each baffle extends latitudinally (Z-axis (not labeled)) through the construct as a hollow compartment for receiving a fill material 20. The baffles may also have rectilinear forms that approximate an oval or ellipsis such as a rhombus or rhomboidal form. The Figures show representative geometries for baffles consistent with the foregoing description. However, the inventive subject matter is not limited to oval-like or elliptical-like geometries and contemplates, for example, any version of a trapezoid up to a rectangle and down to a triangle may be used and substituted in for the oval-like baffles shown in the Figures. And, as noted, shapes representing any desired bounded area may be used in certain embodiments.

Figure 5:
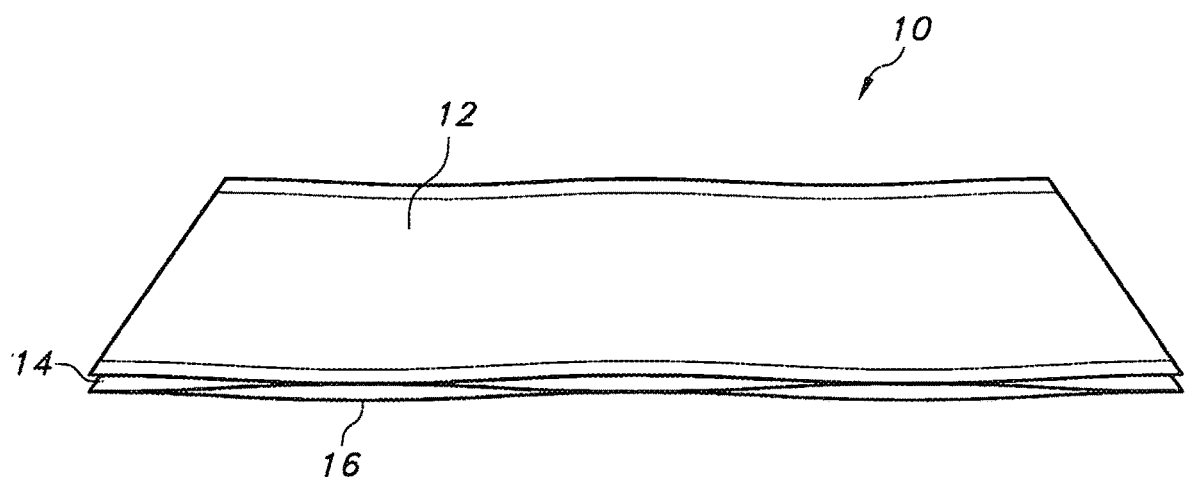
FIG. 5 shows the same view as in FIG. 1 with the layers defining the baffles in a collapsed, planar state.

Each baffle is defined by interlayer 14 and (i) an opposing first layer 12 or (ii) an opposing third layer 16. For example, baffles 18a are defined by interlayer 14 and an opposing first layer 12; and baffles 18b are defined by interlayer 14 and an opposing third layer 16. Each layer has an undulating or sinusoidal like form when expanded to its theoretical shape. In the embodiments shown, when unfilled the baffle construct is collapsible into a planar form given the, non-rigid, pliable nature of the textiles used for each layer, as indicated in FIG. 5. In the collapsed form, each layer is flat against its adjacent layer. As baffle compartments 18a, 18b are filled, joints 19 converge towards one another along a respective X-axis, allowing the intermediate material to move towards maximums and minimums, producing an undulating or sinusoidal cross-sectional form.

Looking at FIG. 3, each baffle has a joint 19 where maxima (peak) Mn and minima (trough) Mn of opposing layers align and merge into a unitary woven, seamless structure. In the embodiment shown, the joint is a flat woven section in a horizontal plane. In other embodiments, the joint could be in a vertical or transverse plane. In such cases, the maxima and minima would not merge but would be connected by a joint in the nature of a strut structure that separates the maxima and minima. Moving along an X-axis (the major axis, in the embodiment shown) from either joint towards the center of a given baffle, the layers reach generally aligned maximum/minimum where there is the greatest separation between the layers along a Y-axis (minor axis). The baffle has a length L between the intersection lines and a height H between the maxima. The baffle has an aspect ratio where L is greater than or equal to H. The aspect ratio of L/H may be greater than one. For example, it may be 1.25, 1.5, 1.75, 2, 2.25, 2.5, 2.75, 3, 3.25, 3.5, 3.75, 4, 4.25, 4.5, 4.75, 5, 5.25, 5.5, 5.75, 6.25, 6.5, 6.75, 7, 8, 9, 10, 11, 12, 13, 14, 15, 16, 17, 18, 19, 20 or greater. The inverse of the foregoing aspect ratios are also contemplated, i.e., H may be greater than L. FIG. 3 shows a baffle construct with three full baffles and a partial, half view of a baffle at each end.

However, a baffle construct can have any number of baffles, and the number shown in FIG. 3 and other Figures is merely intended to convey principles of the inventive subject matter.

A baffle construct 10 may have two or more adjacent levels of baffles. In the illustrative embodiment shown in the Figures, baffles 18a are aligned in a first level L1 along their X-axis; baffles 18b are aligned along their X-axis in a second level L2. The undulations or wave form of each layer 12, 14, 16 is such that first layer 12 and third layer 16 are generally in phase, with the maxima or peaks in each of those layers aligning with each other. Interlayer 14 is generally out of phase by 180 degrees with both the first layer and the third layer. This configuration results in the baffles of one-layer nesting in between baffles of another layer. This nesting allows for uninterrupted distribution of fill material along the longitudinal axis of the baffle construct, eliminating cold spots while having the benefit of seamless construction that advantageously can be performed in a single weaving process, saving on manufacturing steps, materials, and costs. Notably, the overall, cross-sectional profile of the baffle construct may have an undulating or sinusoidal-like form based on the first and third layers 12, 16 being in phase. One possible advantage to this configuration is that it allows more warm air pockets against the body. The volume of each baffle may vary according to need. FIG. 3 shows representative length dimension for a baffle construct for a sleeping bag (8.25 long in the theoretical shape). The woven area where the first layer 12 or the second layer 16 is joined unitarily with interlayer 14 is 0.325 inches wide. To emphasize, these are non-limiting examples and dimensions can be varied considerably to fit performance, aesthetic, manufacturing, and costing needs. Likewise, the depth (Z-axis (not labeled)) of a compartment may vary according to product needs. It may be, for example, from 0.25 inches to 6 inches long for typical apparel or sleeping bag applications, but again this is a non-limiting example. The baffle size and geometry may vary to achieve specific needs and end uses.

In a given baffle construct, the baffles may be woven to have varying configurations, i.e., size, shape, or volume, based on differences in the length, height, cross-section, or volume of a baffle. One advantage of varying baffle parameters is that the construct can be tuned for performance needs. For example, for a parka, higher volume baffles could be positioned at a user's chest where more insulation may be desirable. Lower volume baffles could be positioned at a user's arms or underarms, where less insulation is needed, allowing for more mobility. Lower volume baffles may be positioned at joint areas where more flexibility is needed. Baffles configured with fabrics allowing for more weather-proofness (water and/or wind) or breathability can also be mapped to body zones. For example, the baffles mapping to a user's underarm area may be made of layers of fabric that are more porous and breathable.

Figure 8:
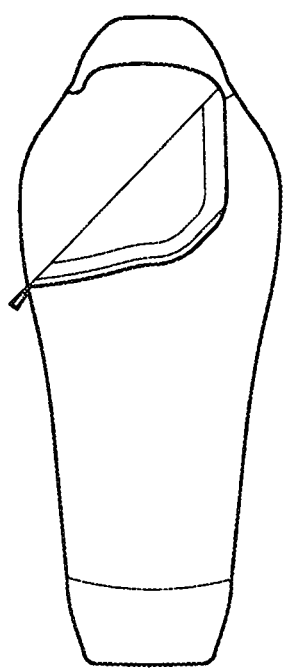
FIG. 8 shows a representative end product, namely a sleeping bag, which may incorporate a baffle construction shown in the Figures or otherwise disclosed and contemplated herein.
Figure 9:
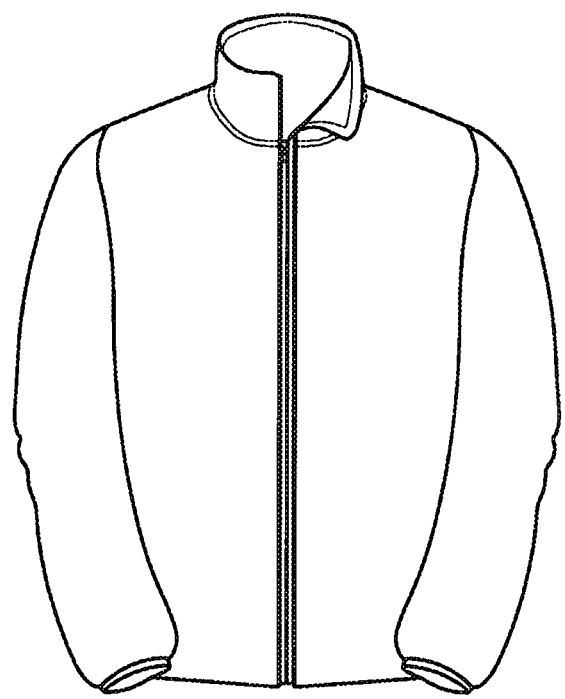
FIG. 9 shows another representative end product, namely a parka, which may incorporate a baffle construction shown in the Figures or otherwise disclosed and contemplated herein.

FIG. 8 shows a representative end product, namely a sleeping bag, which may incorporate a baffle construction shown in the Figures or otherwise disclosed and contemplated herein. FIG. 9 shows another representative end product, namely a parka, which may incorporate a baffle construction shown in the Figures or otherwise disclosed and contemplated herein. The baffles according to the inventive subject matter may be incorporated partially or fully through such end products.

A baffle construct according to the teaching herein may be based on a double weaving or three-dimensional weaving technique, or other known or discovered techniques for unitary, seamless three-dimensional woven structures. To illustrate one such approach, a multilayer fabric, such as the three-layer fabric illustrated in the Figures may be made by weaving a three-layer fabric using multiple warp beams and multiple weft insertions. The warp yarns will be controlled so that some of the yarns will be woven into both the top and bottom weaving planes at different sections of the fabric. This will allow the formation of baffles that will hold insulation in place. The top layer may serve as the outer or shell layer in an end product and the bottom layer may serve as the body-facing liner, as in a traditional baffle construction. The middle layer is woven into both the top and bottom layers to form the walls of each baffle that hold the fill material in place. A Dobby or Jacquard loom system may be used to selectively control warp thread heights and achieve desired baffle or fabric construction. As indicated, this is a non-limiting example of one approach for creating a three-dimensional structure for baffles.

Figure 10A:
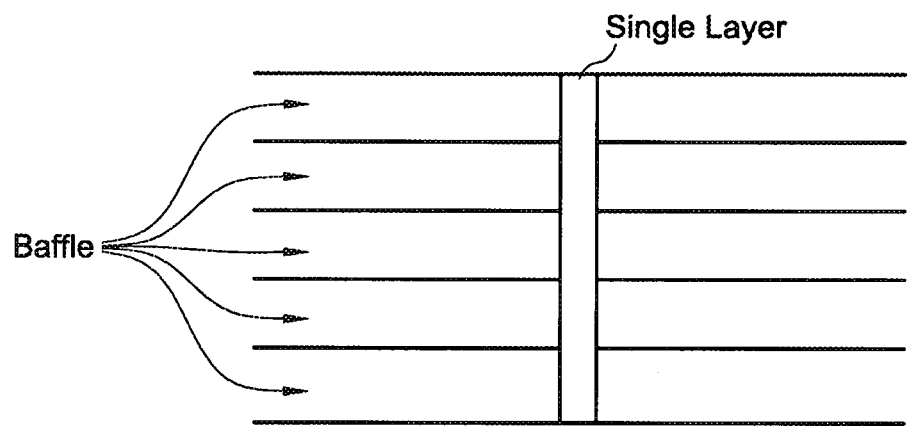
FIGS. 10A-C schematically show how a level of baffles could be closed to create two separate baffle compartments along the width of a fabric.
Figure 10B:
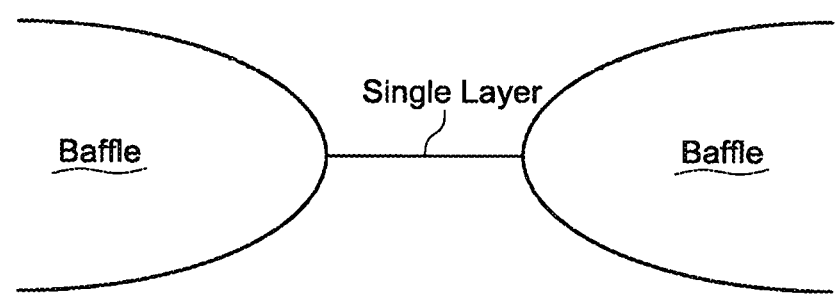
Figure 10C:
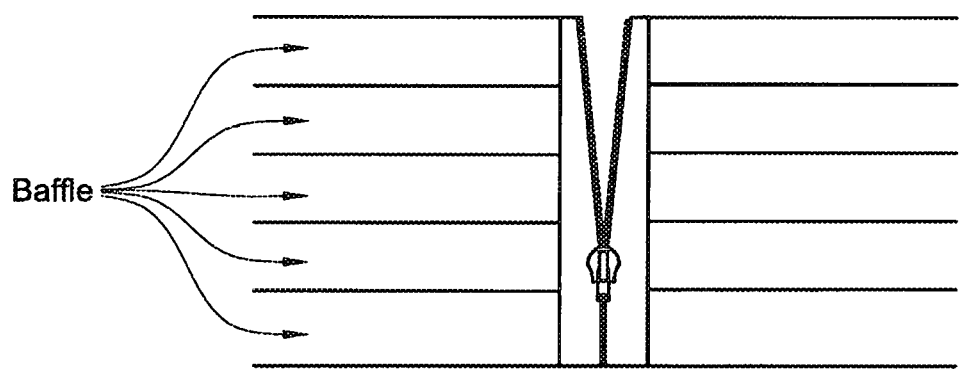

Once the baffle construct 10 is woven, a fill material 20 may be placed in the baffle compartments. First, openings at one side of baffle construct 10 are closed using known means. For example, the openings can be closed by stitching along one selvedge edge of the baffle construct. This is just one representative, non-limiting approach for a closure. For example, in addition to stitching, the baffle ends may be woven closed. Similarly, baffles may be defined across the width of a fabric by a woven closure disposed in the middle or otherwise spaced away from the selvedge edges of the fabric to divide the baffle into two sections, each with an opening at a selvedge edge. (See FIGS. 10A-B). Fill may be introduced at each opening at a selvedge edge. The closure between the selvedge edges seals each compartment. In such a construct, the dividing closure may be flat layer of fabric that separates a baffle into two compartments. The first and third layers 12, 16 may converge together at the layer of closure. The closure may be cut lengthwise with each cut half defining an opening for a garment, sleeping bag, etc. A zipper may be associated with each half, as seen in FIG. 10C. Baffle constructs may be mapped to body areas on a garment such as the one shown in FIG. 10C.

Loose fill material, such as natural or synthetic down may be blown in using known techniques for filling baffles. In general, a blowing system includes a supply of fill material, one or more tubes from the blowing system are placed in openings on the unsealed side of the baffle construct. The fill material 20 is then blown into the compartments to partially or fully fill the compartments. Alternatively, synthetic, non-blown insulative material may be placed into the baffles. After the fill material is supplied, the unsealed side of the baffle construct may be sealed by stitching, or other known means.

After filling and sealing, the baffle construct may be assembled with other materials to make a finished end product or component thereof. Additional layers of material may be added to the baffle construct. For example, a layer of durable or wear resistant material may be added. A layer of waterproof/breathable material may be added. A comfort liner may be added. The baffle construct may be used as a shoe upper and a sole or sole component may be added.

The loose fill contemplated for use with the baffle constructs disclosed and contemplated herein may be any natural fill material such as down or feathers, vegetable or animal fibers or fur, or combinations of the foregoing. One example of synthetic down is Thermoball™ (available in products from The North Face®, a division of VF Outdoor, Inc., Alameda, Calif., USA), which is based on round fiber clusters from Primaloft, Inc., Latham, N.Y., USA. The insulative may also consist of synthetic/down blends, general synthetics, foam, or any other insulate material know or discovered insulative material suitable for use in baffles for apparel, sleeping bags and other end products contemplated herein.

Fill power (or the equivalent for synthetic insulation) may be any desired range from 100, 200, 300, 400, 500, 550, 600, 650, 700, 750, 800, 850, 900, or more, or any range in between based on any generally accepted industry protocol for determining fill power.

Figure 11:
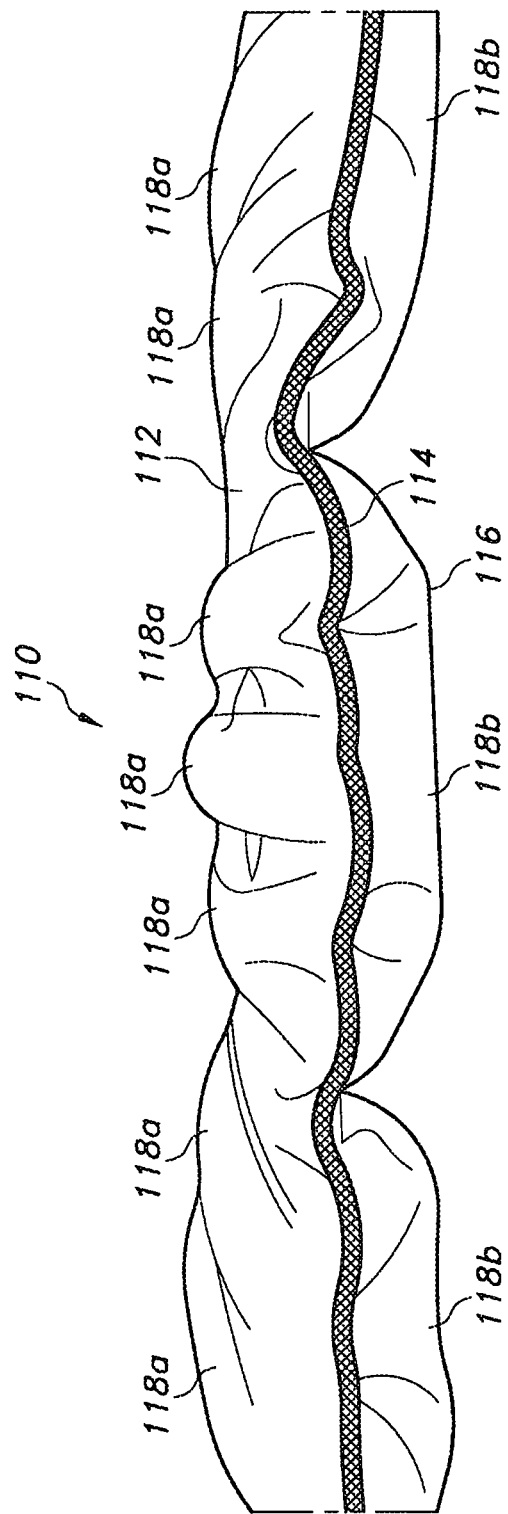
FIG. 11 schematically illustrates a top, side perspective view of an alternative baffle construction having a set of top baffles of a first configuration and a set of bottom baffles of a different configuration, the baffles being represented in a filled state.
Figure 12:
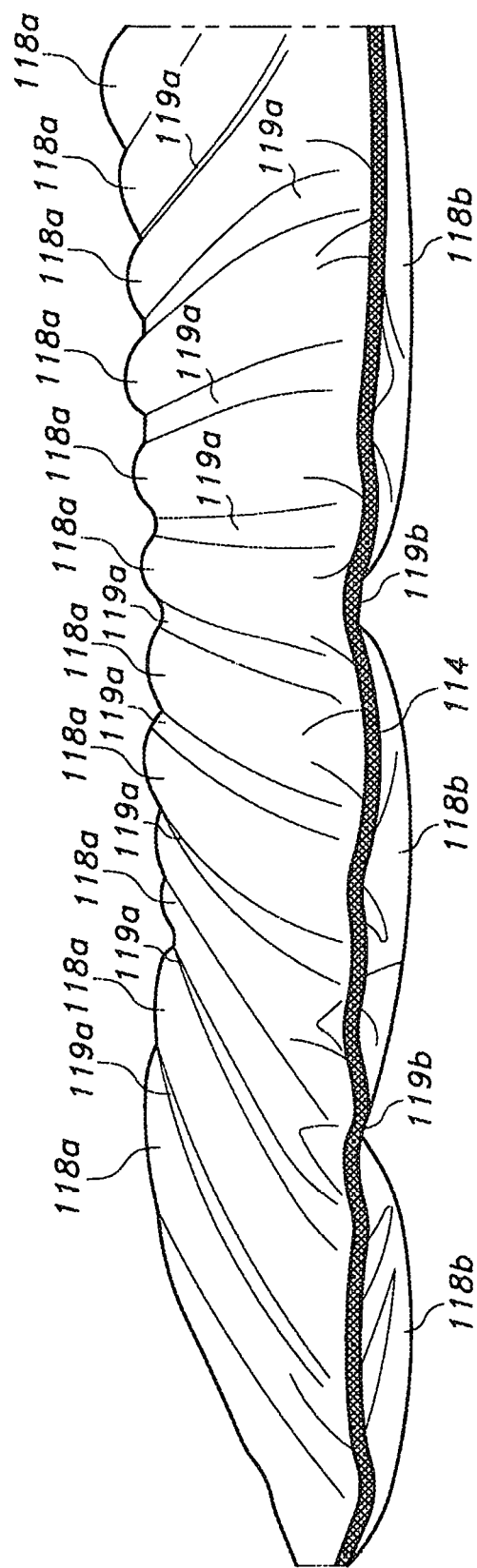
FIG. 12 schematically illustrates a bottom, elevation perspective view of the embodiment of FIG. 11.
Figure 13A:
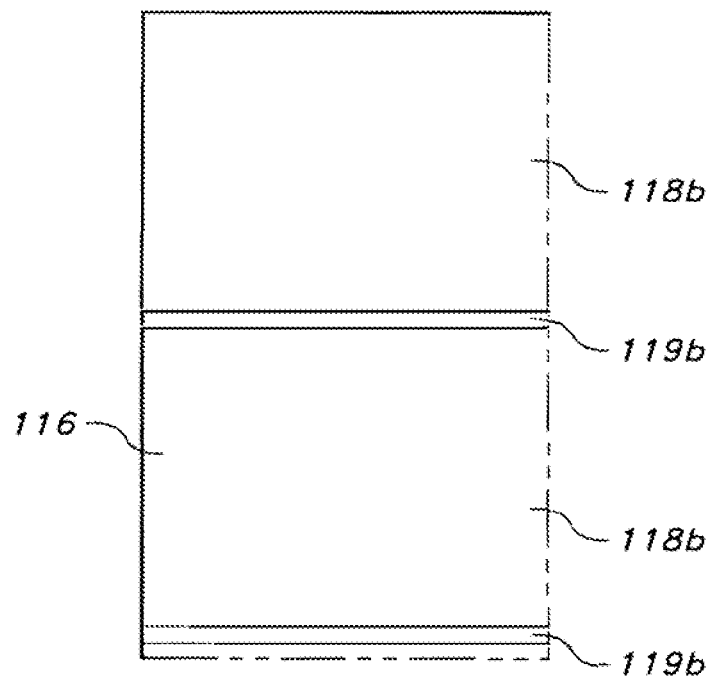
FIG. 13A shows a plan view of a bottom side of a baffle construction that corresponds with that of FIG. 11.
Figure 13B:
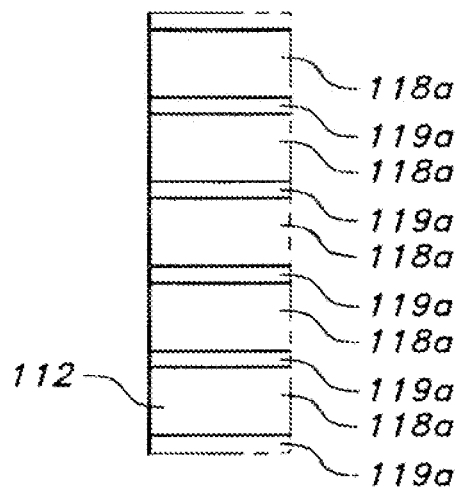
FIG. 13B shows a plan view of the top side of the baffle construction of FIG. 13A.
Figure 13C:
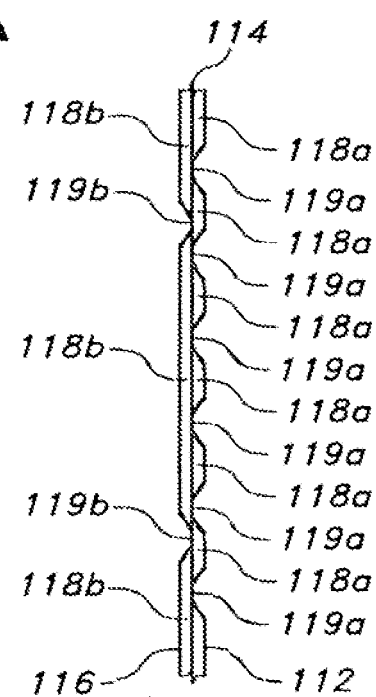
FIG. 13C shows an elevational view of the baffle construction of FIGS. 13A-B.

FIG. 11 schematically illustrates a top, side perspective view of an alternative baffle construction 110 having a set of top baffles 118a of a first configuration and a set of bottom baffles 118b of a different configuration, the baffles being represented in a filled state. In this embodiment, there is not a 1:1 ratio of top baffles to bottom baffles. FIG. 12 schematically illustrates a bottom, elevation perspective view of the embodiment of FIG. 11. There may be multiple top baffles per bottom baffle in a repeating pattern, or there may be multiple bottom baffles per top baffle. The top and bottom baffles may differ in shape, volume length, width, amount of fill material, type of fill material, etc. For example, the entire top level can have the same baffle configuration and the entire bottom level can have the same baffle configuration but which is different from the top level. As another example, the baffles across a given level can have varying configurations.

Similar to other baffle constructions disclosed above, the baffle constructions of FIGS. 11-14C have fabric layers 112/114/116 or 212/214/216 forming the top, middle and bottom levels of baffles, with all being a seamless, unitary woven or knit construction. The outer fabric layers 112/212 and 116/216 have an undulating form. In this case, it is a squared rather than elliptical or oval form.

As seen in the example of FIGS. 11-13C, there are multiple top baffles 118a for each bottom baffle 118b. For example, in the embodiment of FIGS. 13A-13C, three full top baffles 118a overlie each bottom baffle in a repeating pattern. The baffles 118a are separated by joints 119a, which are seamlessly woven together with the baffles. The baffles 118b are separated by joints 119b, which are seamlessly woven together with the baffles. For each joint 119a, there is a baffle 118b that overlies the joint. For each joint 119b, there is a baffle 118a that overlies the joint. Accordingly, the arrangement of baffles 118a and 119b may be considered a form of a nested arrangement of baffles on different levels. (It will be appreciated that the terms top and bottom are relative terms, and in use one level of baffles or the other may be oriented up or down.)

Figure 14A:
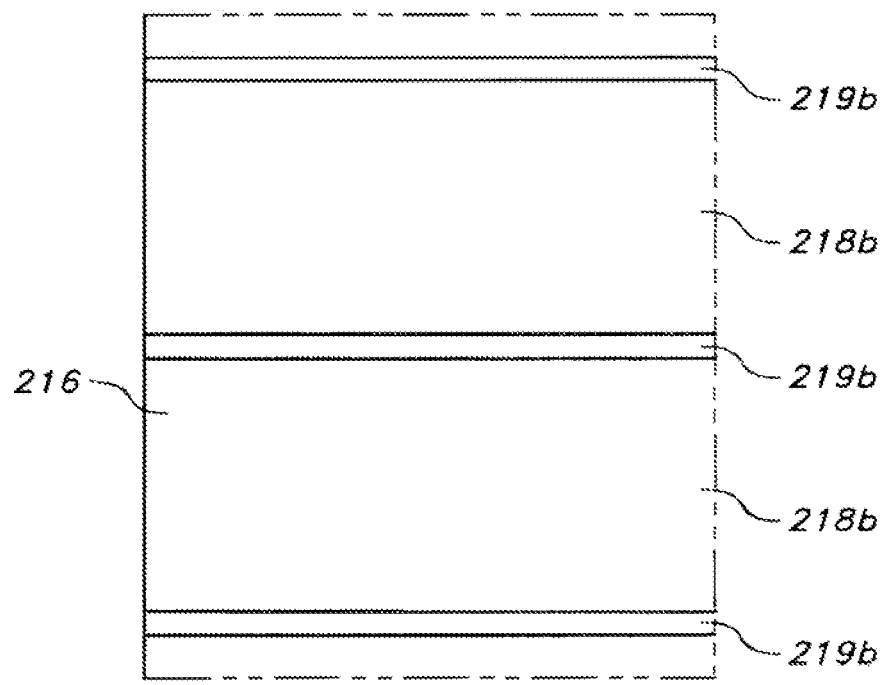
FIG. 14A shows a plan view of a bottom side of yet another alternative baffle construction.
Figure 14B:
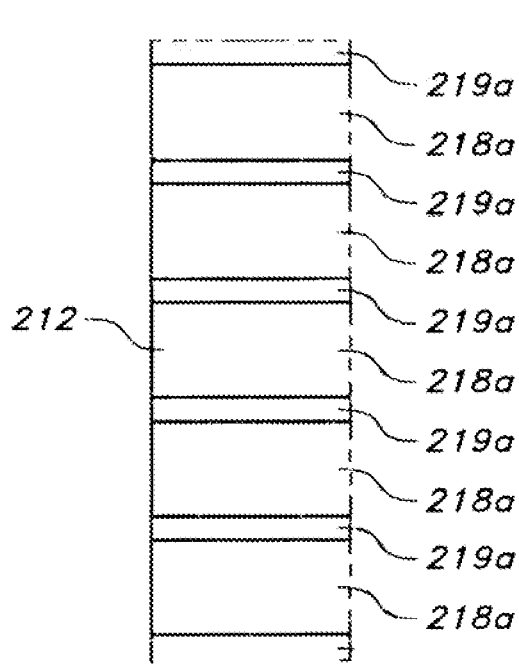
FIG. 14B shows a plan view of the top side of the baffle construction of FIG. 14A.
Figure 14C:
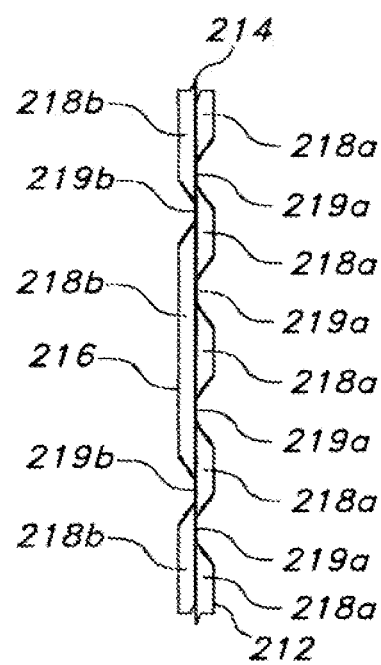
FIG. 14C shows an elevational view of the baffle construction of FIGS. 14A-B.

FIGS. 14A-C show an arrangement of baffles 218a and 218b similar to those described above (baffles 218a/218b). In the embodiment of FIGS. 14A-C, a first full top baffle 218a is generally centered over a first bottom baffle 218b. To the left and right of such first fully overlying top baffle 218a are left and right adjacent top baffles 218a. About two thirds to about one-half of each of those adjacent baffles overlies the first bottom baffle 219b, the other portion of those partially overlying top baffles extend over joints 219b to overly at least an edge of the left and right bottom baffles 219b that are adjacent the first bottom baffle. Accordingly, the arrangement of baffles 218a and 219b may be considered another form of a nested arrangement of baffles on different levels.

Similar to other embodiments disclosed herein, in the embodiments of FIGS. 11-14C, the fabric layers 112/116 or 212/216 forming the top, middle and bottom levels of baffles have different undulating forms. The middle layer 114/214 has a straight or flat non-undulating form, as seen from the theoretical shapes of FIGS. 13A-14C. However, in other possible embodiments, the middle layer may have an undulating form. In the embodiments shown, the baffles 118/218 are rectilinear in form. As contemplated herein, they may be quadrilaterals. In the embodiments shown, the theoretical forms are trapezoidal.

As indicated above, any one or more layers, for example, layers 12, 14, and 16, in a baffle construct may have multiple zones of varying attributes, all seamlessly joined in a unitary, woven construct. U.S. provisional application 61/991,293, UNITARY WOVEN FABRIC CONSTRUCT OF MULTIPLE ZONES, filed 9 May 2014, under common assignment with the present application, discloses fabric constructs having such multiple zones, and is hereby incorporated by reference in its entirety for all purposes. To illustrate principles of such a construct, FIG. 15 schematically shows one possible multiple zone fabric construct configuration, and is discussed in more detail below.

In embodiments that have multiple zones in a layer, a woven fabric consists of weft and warp yarns, and the fabric has an area defined by plurality of zones consisting of at least one zone of a first zone type, at least one zone of a second zone type; and, optionally, at least one zone of a third zone type. The third zone may be a transition zone disposed adjacent the first and/or second zones. All the zones are formed in a unitary woven construct, with adjacent zones seamlessly joined together. The transition zone includes a plurality of bands of sets of weft and/or warp yarns that collectively provide a progressive transition for an attribute of the first zone type through at least the transition zone and to the second zone type, if present. The fabric construct may be used in various end products and is particularly suited for use in apparel applications. In such applications, there may be a mapping of a pattern for a product, such as an apparel item, to the fabric construct so that the zones in the fabric construct each map to different at areas on the apparel item or other product, which each provide a difference for a selected functional and/or visual effects attribute. Each zone in the fabric construct may be distributed to two or more separate areas on the apparel item or other end product. Each area is configured to provide a difference for a selected functional and/or visual effects attribute.

Functional zones of a given weaving type may be for one or more of the following attributes:
Durability (as measured by strength and/or durability)
Breathability (permeability)
Elasticity (for example, to provide good fit, stretchability, performance zones)
Comfort (hand)
Insulation
Waterproofness
Flame retardancy
Visual effects (e.g., colors, patterns, surface textures)
Zones may vary based on:
Types of yarns used
Denier of yarns
Weave attributes including type of weave, or number and or spatial relationships of yarns in a given weave, e.g., fabric count.

Figure 15:
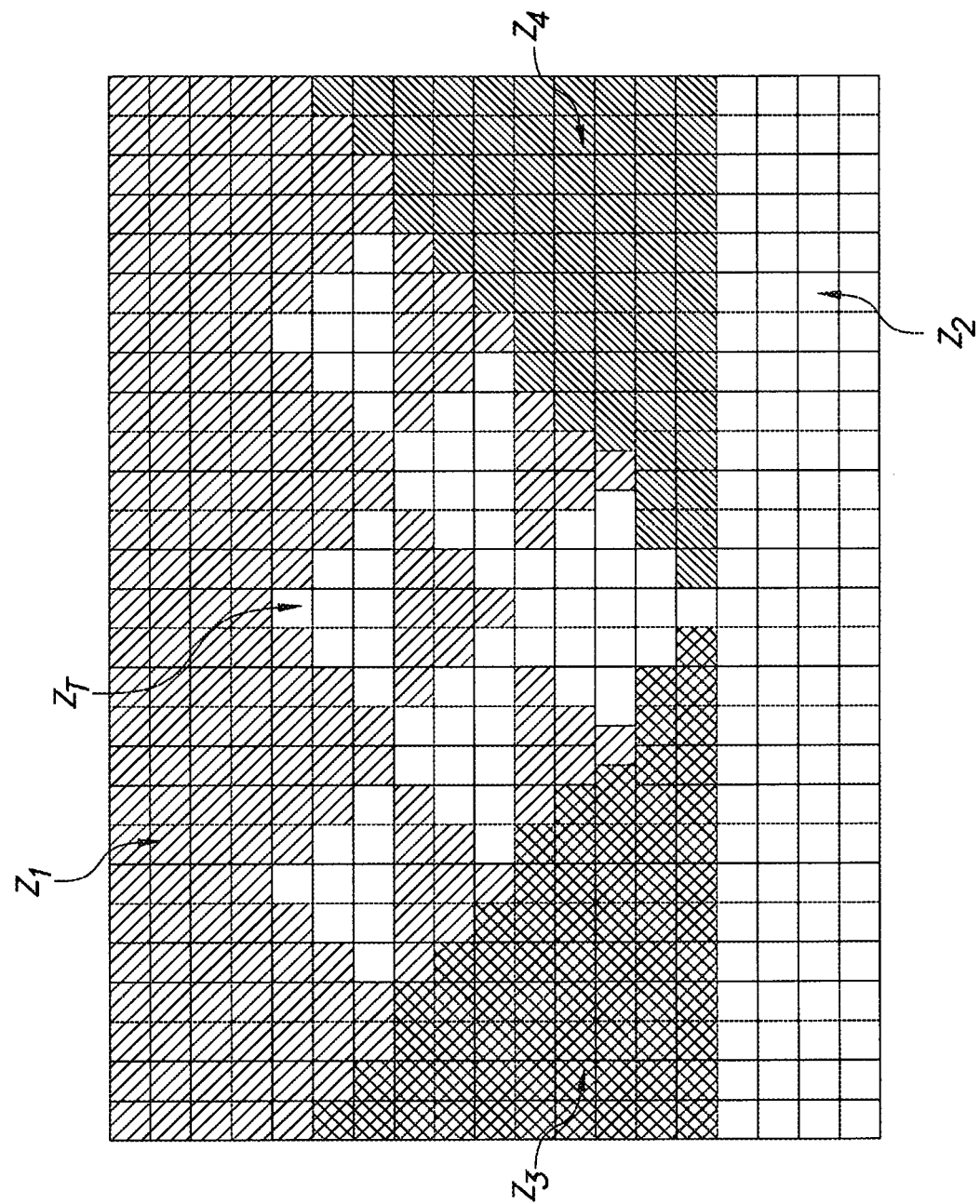
FIG. 15 schematically shows one possible multiple zone fabric construct configuration.

Accordingly, referring to FIG. 15 as an example, the inventive subject matter contemplates at least a first zone type (Z1) and a second zone type (Z2) that differ in one or more attributes. In between the first and second zone types may be a third zone type that is adjacent to each but different from the first and second zones. In some embodiments, for attributes that are numerically measurable, a comparison of a given attribute used in one zone type compared with another zone type shows at least a 10%, 20%, 30%, 40%, 50%, 60%, 70%, 80%, 90%, 100%, 125%, 150%, 200%, 250%, 300%, 400%, 500%, 600%, 700% 800%, 900%, 1000%, 5000%, 10,000% or greater relative difference.

Under the inventive subject matter, the third zone type may be a transition zone (ZT) that has a selected blend of one or more attributes of the first and second zone types that are adjacent or closely spaced to a transition zone. The transition zone is part of a unitary, seamless weave with two or more adjacent zones of different types. The transition zone may provide a progressive transition of some or all attributes of one adjacent zone type to one or more other different adjacent zone types. Typically, the transition zone is spaced in between and separates—in whole or part—two different zone types that are adjacent the transition zone. Most typically, as seen in the FIG. 15, the different zone types are adjacent to the transition zone and on opposite sides of it.

Apart from transition zones, other zone types that are adjacent or closely proximate a given transition zone may have one or more selected attributes that remain uniform or constant across the zone. Transition zones are different with respect to the one or more selected attributes of the zones they serve, and, the selected attribute or attributes are progressively varied across the transition zone, as described in more detail below.

A fabric construct that may serve as one or more layers, for example layers 12, 14, and/or 16, includes sets of longitudinal yarns and transverse yarns, known to persons skilled in art as weft and warp yarns, that are interwoven and intersect, forming a plurality of cells. The fabric may be made of any suitable material. The fabric construct in post-formation steps may be laminated with one or more layers of constructs or materials, for example, polyester; nylon; cotton, silk; nanoweb; polypropylene; waterproof-breathable membranes, such as expanded PTFE membranes, polyurethane films, polyester films; or other polymer-based woven, nonwoven or knit constructs. The fabric constructs may be laminated with other plies of materials to form multilayer constructions. It is contemplated that a fabric construct may be dependent upon the nature of the object or garment for which the construct will be used. For example, the composition of the base fabric construct may be an elastic-based, stretchable material for athletes, fire resistant material for firefighters or high durability material for camping equipment and/or military purposes. Other materials suitable for use in the fabric construct will be readily apparent to one of ordinary skill in the art from the teachings herein.

In typical embodiments, the weft yarns and warp yarns are orthogonal to one another, resulting in a crosshatched in the fabric construct. Other suitable configurations such as, for example, various diamond shapes, are also within the scope and spirit of the inventive subject matter. In some embodiments, the yarns have a denier rating in the range of from about 5 denier to about 1050 denier, depending on the object or garment. Higher denier yarns (e.g., 850 denier) are appropriate for objects consisting of, for example, heavier canvas materials while lower denier yarns (e.g., 40-70 denier) are more appropriate for, for example, lightweight jackets and camping equipment.

A variety of manufacturing techniques may be used to make different areas of the fabric construct to have any of the aforementioned different fabric properties. For example, in one possible embodiment, nylon-based yarns are interspersed in the fabric at defined spacings to create a durability zone. The durability zone may be based on a high tenacity yarn, such as nylon Cordura™ yarn. Alternatively, durability zone could be based on a ripstop fabric construction. In some possible embodiments, the yarns used for the ripstop lines may include, for example, silicon impregnated ripstop, polyurethane coated ripstop, reflective ripstop, heat and solar reflective ripstop. Other treatments readily apparent to one of ordinary skill in the art are within the scope and spirit of this invention based on the present disclosure.

In certain embodiments, a fabric construct, zone Z1 is seamlessly connected in a unitary weave of fabric to an adjacent zone of different attributes, e.g., lower durability but higher permeability. In other words, the zones are formed in the same weaving process and are not separate panels that are joined together after each is woven. For example, referring to, all other things being equal, a zone of fabric construct may be formed of cells that impart greater durability compared to a portion of the construct this is formed of cells of a different nature. The varied durability may be achieved by variations in, e.g., density of yarns, weaving patterns, materials (e.g., in terms of yarn structures and/or material types), manufacturing processes (chemical, mechanical, etc.).

As indicated above, in some embodiments, a multizone unitary fabric may have varying properties, such as breathability, across different layers or zones in a given layer. For example, zone Z2, may be formed of larger cells of warp and weft yarn intersections. The varied breathability may also be achieved by variations in, e.g., density of yarns, different weaving patterns, different materials, and/or different manufacturing processes (chemical, mechanical, etc.).

In certain embodiments, the fabric and baffle constructs disclosed herein come off a weaving machine as rectangular structures that have a warp length defined by the length of the set of yarns in the warp direction, and a weft width defined by length of the set yarns in the weft direction. Where the different zones in the fabric run orthogonal to the warp direction, the zones may be defined by a variation in sets of successive weft yarns. And vice versa, where the different zones in the fabric run orthogonal to the weft direction, the zones may be defined by variations in sets of successive warp yarns. In other words, as seen in the Figures, the different zones Z1, ZT and Z2 may be defined in terms of parallel yarns that run edge to edge along the weft and/or warp directions. Although not shown, by varying both weft and warp threads, a rectilinear as in a plaid pattern, or other geometrical zone, of a different overall nature than other zone types, maybe created amidst zones that are based on weft and warp yarn orientation. In such a rectilinear zone, the zone can be isolated in any section of the grid of the fabric and does not extend edge to edge, as in other embodiments.

The fabric constructs, and consequently the zones in the fabric construct, may have varying dimension depending on application and intended use. In general, to provide for permeability or comfort in apparel, a given zone type may have a relatively large surface area. For example, a surface area of at least 4 square inches may provide breathability in an underarm area. A zone of 25 square inches or more may provide good breathability or protection in other areas of a garment. The inventive subject matter contemplates that the square inches of a zone in the fabric, as it comes of the weaving machine, may typically range from 1 to 900 square inches or more for a garment application, although higher or lower area may apply depending on the desired result. In certain embodiments, the zones are parallel areas that run edge to edge in the construct. A fabric construct may have any number of zones of two or more zone types. For example, there may be 2, 3, 4, 5, 6, 7, 8, 9, 10, 11, 12, 13, 14, 15, 16, 17, 18, 19, 20 or more different zone types, each representing a different functional attribute and/or visual-effects attribute. The attributes may be imparted by the nature of the yarn types and/or weave characteristics of a zone type.

Because the zones in the fabric construct must be usable with the pattern for a garment, it is generally contemplated that the edge-to-edge width of the zones in the weft or warp direction of a fabric construct coming off the weaving machines will be at least 1 inch so as to provide a minimum dimension of sufficient surface area for a functional zone in an end product such as a garment.

As used herein, the "height" means the dimension orthogonal to the width of the zone. The height of the zone may also be at least 1 inch. In some applications, the width of the zones may be at least 4, 6, 8, 10, 12, 14, 16, 18, 20, 22, 24, 26, 28, 30, 32, 34, 36, 38, 40, 42, 44, 48, 50, 52, 60, 62, 64, 66, 68, 70, 72, 74, 76, 78, 80, 82, 84 inches or thereabout. In many applications, the height of the zones may be at least 4, 6, 8, 10, 12, 14, 16, 18, 20, 22, 24, 26, 28, 30, 32, 34, 36, 38, 40, 42, 44, 48, 50, 52, 60, 62, 64, 66, 68, 70, 72, 74, 76, 78, 80, 82, 84 inches or thereabout.

The relative heights of one zone to another may vary in a fabric construct as it comes off the weaving machine. However, they are generally going to be of similar scale or magnitude. For example, a set of adjacent zones may have relative heights that are within 0.25 to 10 times one to the other, or thereabout.

The spacing of the warp yarns may be uniform or may vary. The spacing may occur in a pattern. For example, the spacing may be uniform of a given first multiple of warp yarns and then change for second multiple of warp yarns. The foregoing is true for yarns in the weft direction. The spacing of the warp yarns may be the same or different from the spacing of the weft yarns. A fabric may preferentially show on a given side warp or weft yarns. For example, a fabric of a twill construction may preferentially show on one surface weft yarns that are floated over the warp yarns.

As another example, in a dobby or jacquard weave, a fabric may preferentially show warp yarns or weft yarns at a face surface by varying the relative spacing and number of a given yarn type. For example, a warp face or weft face may be determined by changing the relative cover of the warp and weft yarns.

The inventive subject matter contemplates that the weave types used in any one or more zones may be any of a number of standard weave types. For instance, contemplated weave types include: plain, basket, ribbed, twills, satin, Dobby, Faille, Ripstop, and leno (imbalanced) and combinations thereof. The fabric constructs and zones therein may be formed in whole or part from interwoven fabrics, using three two or more sets of yarn, each at a different level in the construct. The woven fabrics may be produced on any type of standard loom, including, Jacquard, computerized Jacquard, Dobby, auto Dobby, and the like. Weft insertion can be accomplished through various methods including air jet, water jet, or rapier and the like. The fabrics may be processed with piling or napping.

In one or more embodiments, a fabric with a unitary, multizone structure manufactured according to this disclosure may use a different pattern to indicate the multizone structure. For example, one embodiment may have color patterns, and varied shades of colors may be used to indicate a multizone structure. Another embodiment may use repetitive patterns and varied densities of repetitive patterns may be used to indicate a multizone structure, as well as color or shading variations. In a further embodiment, a fabric with a multizone structure manufactured according to this disclosure may use no visual pattern to indicate the multizone structure.

The baffle construct, e.g. construct 10, may be implemented in any one or more layers. In one possible embodiment, the construct may be laminated onto a middle layer. In another possible embodiment, the multizone structure may include printed or otherwise deposited material that forms a layer. More particularly, any baffle construct, or portion thereof, may be used as or assembled into a one-layer (1L), 1.5 layer, a two-layer (2L), 2.5 layer (2.5L) or three-layer (3L) construction (the baffle construct being treated as a single layer, although it is actually a multilayer construct). The top (outermost) layer may be one type of material (e.g., textile or deposited chemical materials) suitable for external use (e.g., exposed to the outside) and the bottom innermost layer may be one type of material (e.g., textile) suitable for internal use (e.g., in contact with human body).

In any embodiment, the weave type of a given layer or zone therein may be varied in at least four ways: (i) use of different yarn types; (ii) differences in denier for a given thread or yarn; and (iii) higher density of cross-over points. Additionally, denier can effectively be changed by use of multifilament yarns, e.g., twisting together of the same of different thread or yarn types. In a given layer or zone, the layer or zone will be influenced most by a given yarn type or yarn denier that is the majority or a major component of the overall layer or zone. (If multiple types or deniers are used in a given layer or zone, then one type or denier may not be present in a majority form, in which case, the influence of the yarn representing a major component will be most influential.) A yarn may be a majority or major component by looking at thread count and/or weight in the overall layer or zone. The main consideration is whether a given layer zone having differing yarn types or yarn deniers has overall differences from another layer or zone based on differences in the majority or a major component of yarn types or deniers used in a given overall layer or zone compared to that of another layer or zone.

As indicated, in some embodiments, the attributes of the layers or zones therein may vary according to the weft yarn types and/or weaving types used. In other embodiments, the weft threads could be constants across layers/zones and the warp threads varied. In other embodiments, both warp and weft threads could be varied. Accordingly, layer/zone attributes depend on the nature of the weft yarn types, warp yarn types, and/or weave types in different layers/zones. To illustrate further, in any given construct, while the warp yarns may remain constant, they do not necessarily need to be the same yarn type across the warp direction. For example, the yarn type may change moving across the warp. The variation may be in terms of yarn material, denier, or any other yarn attributes. The variation may have a pattern, for example, one yarn type may be a base yarn type, with a different yarn type being present after given multiples of the base yarn type. Any plurality of different yarn types may be arranged in the warp direction.

If transitioning is used, the transitioning need not be for all the attributes of a given layers/zone or set of layers or zones. For example, if a first layer or zone has unique durability attributes based on yarn types and visual effects attributes, and the second zone has unique breathability attributes based on openness of weave type, and a unique visual effects attributes, various forms of transitioning are possible. For example, the transition zone could provide for only smooth transitioning of a heavier yarn type in the first zone to a lighter yarn type in the second zone. Alternatively, it could allow for only transitioning of a tighter weave in the first zone type to a more open weave in the second zone type. Or it could only allow for transitioning of, for example, black-colored yarns in the first zone type to white colored yarns in the second zone type. Combinations of attribute transitions are also possible. For example, the transition zone could allow for smooth transitioning of weave openness and yarn color. Or it could allow for transitioning of all attributes in the examples, namely denier of yarn type, weave openness, and yarn color. In short, any one or more attributes may be transitioned alone or in any selected combinations.

Transitioning can be achieved in any number of ways based. For example, where warp yarns are constant, going across the transition zone from a first zone to a second zone, the transition zone may be defined in terms of a plurality of bands of one or more weft yarns in a pattern. The composition of yarn types or spatial relationships of yarns from band to band are varied to collectively provide for a progressive transition between zones. Instead of, or in addition to, progressive banding of weft yarns, the warp yarns could be banded in such fashion as described above (or below) to create a progressive transition across a defined transition zone.

As an example of progressive bands of weft yarns, the bands closest to a first zone Z1 could have a relatively high percentage of weft yarns of the same type as the first zone and a relatively low percentage of weft yarns of the same type as the second zone, with the percentage varying from band to band. With each successive band closer to the second zone, the percentages shift to become more like that of the second zone. Progressive banding can also be achieved using just one yarn type, not a blending of yarn types of the first and second zones based on variations other properties for a zone. For example, the bands could have just the yarn type of the first zone type and not include any of the second zone type. The first yarn type may be combined with another yarn type that is different from the weft type of the second zone. For example, the other yarn type could be the same yarn type used in the warp threads or entirely different from any yarn type used in the first and second zones.

To illustrate a range of other possibilities, if the warp yarns are a lightweight yarn, such as polypropylene, and the first zone is a durability zone of a high tenacity yarn, such as, but not limited to, 70D Nylon 6,6, and the second zone is breathable, lighter weight zone that includes a lightweight Nylon, such as 40D Nylon. The transition zone could be based on a combination of any of the three yarn types in bands that progressively shift across the transition zone. If just a single yarn type is used, for instance, breathability could be achieved by varying the weave type, as discussed elsewhere herein.

In combination with variations in yarn types and blends, or as an independent form of progressive transition, the weave type may be varied going from one zone type to another. For example, the first and second zones could have the same type of yarns but differ in weave types. The transition could be in terms of going from a zone of tight weave (high fabric count) to a zone of relatively loose weave. By varying the yarn types and/or weave types, each of the successive bands in a progressive transition may or may not be based on use of the same yarn types or weave types as in adjacent or successive bands.

Further, the yarn types in the bands need not be the same as any yarn type used in the first or second zones types. Instead, they may be different but may still provide for a progressive transition in the attributes of one zone type to another. To illustrate, if warp threads are polypropylene, for example, and the first zone is a durability zone of a high tenacity yarn, such as 70D Nylon 6,6, and the second zone is a breathable, lighter weight zone of a relatively light weight Nylon, such as 40D Nylon, the transition zone could be constructed from a set of bands that are not the same as in the first and second zones but which have varying denier and tenacity that is intermediate those zones. For example, a first band proximate the first zone could be 65D Nylon, a successive band closer to the second zone could be 55D Nylon, a third band even closer to the second zone could be 50D Nylon, and so forth.

The number of bands in a transition zone can vary from a few to a multitude, depending on desired properties. However, in general to provide for progressive transition in apparel applications, a transition zone of at least three bands may be suitable. However, finer granularity may be desirable, and the number of bands each providing for a successive progression of properties may be 4, 5, 6, 7, 8, 9, 10, 15, 20, 30, 40, 50, 100, 200, 300, 400, 500, 1000, 10,000 or more, or any value or range in between.

It is generally contemplated that the edge-to-edge width of the zones in the weft or warp direction of a fabric construct coming off the weaving machines will be at least 1 inch so as to provide a minimum dimension of sufficient surface area for a functional zone in an end product such as a garment. In many applications, the height of a band, as defined by the height of the set of parallel threads for the band, may be a percentage of the overall height of the transition zone containing the band. In many applications, the height of a given band may be 0.001%, 0.01%, 0.1%, 1%, 4%, 6%, 8%, 10%, 12%, 14%, 16%, 18%, 20%, 22%, 24%, 25%, %, 26%, 28%, 30%, 32%, 33%, 34%, 36%, 38%, 40%, 42%, 44%, 48%, 50% or thereabout the height of the transition zone.

In some applications, for example, sleeping bags, the various dimensions of zones of any type or bands in a transition zone could be considerably larger than in apparel applications.

In some embodiments, there is a changeover point in the transition where there is selective change in the floating or facing of one yarn type. For example, (i) in a first portion of the transition zone proximate the first zone, weft yarns that are reflective of the weft yarns in the first zone are floated to place them at the face of the fabric and/or (ii) in a second portion of the transition zone proximate the second zone, weft yarns that are reflective of the second portion are floated to place them at the face of the fabric. In certain embodiments, a progressive transition of attributes may be created by selectively floating yarns. For example, yarns may be floated in successive rows to define a pattern of discrete shapes that progressively change across the transition zone and thereby define the progressive transition of attributes in a transition zone, at least in part. Using selective floating, a transition zone may be from edge-to-edge in the fabric construct, or it may be defined in discrete areas that are spaced from the edges of fabric construct, anywhere in the grid of the fabric construct.

The pattern may be a pixelated pattern with progressive change in pixel size, shape and/or spacing. A Jacquard control may be used to selectively float weft threads at a face of a fabric. The density, size, or shape of dots or other pattern elements may be progressively changed in the transition zone to a progressive transition in terms of functional and/or visual effect. A twill weaving process may be used to provide for selective floating of weft yarns at a desired side of the fabric. In other embodiments, the weft or warp threads may have a differing cover so that one or the other is selectively placed at the face of the fabric.

Change in the float of a yarn in a fabric construct can affect functional, as well as visual attributes of the fabric construct. For example, areas of low float density may be more durable, more stretch resistant, and/or less permeable compared with areas of higher float density.

In some embodiments, one or more layers may incorporate thermoplastic yarns. The layer or layers may be placed on a form or molded of a selected shape or patterned surface and heated. The heating will set the fabric with the corresponding shape of pattern of the form, mold, or pattern. For example, a form may represent an anatomical body part and the setting of the fabric to the shape of the body party will provide a garment that anatomically conforms well to the part.

In some applications, a baffle construct may have varying yarn sizes or material types across layers or zones. For example, one layer may be made from a majority (or major component) of yarns of a first yarn size (denier) that is greater than the yarn size of a majority (or major component) of yarns used in another layer. To illustrate, for applications where natural down or a close variant is used as a fill material, it is desirable for the outward-most facing fabric layers to be downproof, i.e., not subject to penetration by down fill. An outward facing layer, e.g., layer 12, may be a lining layer that goes against a user's body and an opposing outward facing layer, e.g., layer 16, may be a shell layer that faces the environment. Downproofness is generally a function of thread count—higher thread counts mean more downproofness, and so it is important for outward layers to have sufficiently high thread counts so that fill material penetration is prevented or acceptably minimal. Unfortunately, weaving machines have thread count limitations in the weft and warp dimensions. Consequently, for some applications, in unitary, seamlessly woven fabric constructs of two, three, or more layers of fabric, the layers that need to be downproof cannot be made with sufficiently high thread count. (In other applications, as persons skilled in the art will recognize, some 3-layer fabrics using higher denier yarns may have equal density layers and still be downproof, i.e., not all fabrics need the larger yarn in the middle to help with downproofness of the outer layers.)

According to the inventive subject matter, one way that downproofness may be achieved in outward facing layers is variation of yarn size along the weft direction to selectively place yarns in desired layers. The inventive subject matter overcomes the obstacle of thread-count limits by using a higher denier weft yarn in a layer that does not need to be downproof, e.g., layer 14, the interlayer. This means lower denier weft yarns are available for insertion into the outer layers within the thread-count limitation or a given weaving machine. In other words, in the example presented, this scheme allows the insertion of less yarns of a larger size to achieve the same density as more yarns of a lesser size. Accordingly, maintaining density offers a measure of downproofness to the intermediate layer.

In some applications, a baffle construct may have varying thread densities across layers or zones. For example, in many applications, the only layers that need to be completely downproof are the outer layers, e.g., layers 12, 16. The interlayer, e.g., layer 114, only needs to be dense enough to hold the majority of the down in place (i.e., if some feathers transfer from baffle to baffle, it is generally not an issue). Removing density from the interlayer allows for higher density in the outer layers and reduction of the overall weight of the construct. Accordingly, in this example, the reduction of density in the interlayer is for weight saving purposes, not for the downproof purpose described above. As a weight saving measure, it is contemplated that the interlayer can be a low density taffeta or a lattice-like structure like an open mesh.

The foregoing approaches of selectively varying yarn denier, yarn material (e.g., hydrophobic, hydrophilic, elastic, etc.), or fabric density may be used in other applications. For example, the foregoing principles may be used to provide selective breathability, windproofness, waterproofness, thermal insulation, moisture transport, elasticity, abrasion resistance, cut/tear resistance, anti-compression resistance, increased compressibility, purely aesthetic features, such as color amongst others, and other desired attributes in one layer or zone versus another.

In addition to the foregoing approaches for providing downproofness, independent or supplemental approaches include external finishing techniques such as a cire finishes, coatings, and/or laminates.

One standard for assessing downproofness has been set by the International Down and Feather Laboratory Institute (IDFL), and may be found on their website \www.idfl.com, with a current test at http://www.idfl.com/media/pdfs/IDFL%20Downproof%20vs%20Air%20Permeability.pdf.

Under the 2008 test at the above link, downproofness is the fabric's ability to contain down and feathers. The test involves placing a test pillow into a tumbling box where it is tumbled for 30 minutes, during which time it is struck by rubber stoppers (complete procedure is available upon request). This procedure attempts to mimic the actual use of the product. Downproofness is considered poor when many fibers and/or feathers are able to pass through the fabric.

The rating is based on a scale from 1-5 (with 1 being the worst and 5 being the best). The rating is based on the number of fibers and/or feathers that pass through the fabric of a test pillow.

Rating System:
5=Pass (little or no leakage through fabric)
4=Pass (minimal or normal leakage through fabric)
3=Borderline
2=Fail (above average leakage through fabric)
1=Extreme Fail (significant leakage through fabric)

Another standard for evaluating the suitability of a fabric to contain fill material is fiberproofness. This is an analogous evaluation to downproofness but applies to synthetic fiber fills. A fiberproof fabric may be slightly more air permeable than downproof but still prevents the migration of synthetic insulations like basic Primaloft insulation.

As used herein, "and/or" means "and" or "or", as well as "and" and "or." Moreover, all patent and non-patent literature cited herein is hereby incorporated by references in its entirety for all purposes. The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of fluid heat exchange systems that can be devised using the various concepts described herein. Moreover, those of ordinary skill in the art will appreciate that the exemplary embodiments disclosed herein can be adapted to various configurations without departing from the disclosed principles. The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the disclosed inventions are not intended to be limited to the embodiments shown herein, but are to be accorded the full scope consistent with the language of this disclosure, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No element is to be construed under the provisions of 35 USC 112, sixth paragraph, unless the element is expressly recited using the phrase "means for" or "step for".

Thus, in view of the many possible embodiments to which the disclosed principles can be applied, it should be recognized that the above-described embodiments are only examples and should not be taken as limiting in scope. We therefore reserve all rights to the subject matter disclosed herein, including the right to claim any and all combinations of subject matter described herein, including but not limited to all that comes within the scope and spirit of the following claims.

The invention claimed is:

1. A baffle construct, comprising:
a drapable, pliable multilayer construction of a first layer, one or more interlayers, and a third layer, the interlayer being disposed between the first and third layers, the layers all being part of a unitary, seamlessly woven fabric construct, the layers being joined so as to define a plurality of baffles, and
wherein an elongate flat woven section comprising a closure is disposed in the baffle construct, the closure comprising sections that can separate from one another, thereby dividing multiple rows of baffles into two sections of baffles on either side of the closure, with the closure sections and the baffle sections being seamlessly woven with each other, the closure being suitable for forming an opening in the construct on separation of the separable closure sections.

2. A baffle construct comprising:
a drapable, pliable multilayer construction of a first layer, one or more interlayers, and a third layer, the one or more interlayers being disposed between the first and third layers, the layers all being part of a unitary, seamlessly woven fabric construct, the layers being joined so as to define a plurality of baffles, and wherein the baffles are expandable from a first collapsed configuration to a second expanded configuration; and
wherein at least one layer is downproof or fiberproof, and one of the interlayers has an overall fabric density that is lower than the overall fabric density of the first and/or the third layers, the first layer and/or the third layer being downproof or fiberproof based on its overall fabric density.

3. The baffle construct of claim 2 wherein the baffle construct has a flat form when in the first collapsed configuration, with the first layer being adjacent one side of the interlayer and the third layer being adjacent to an opposite side of the interlayer the layers being disconnected from one another except at spaced apart joints at (i) top side of the interlayer where the first layer merges therewith and (ii) at the bottom side of the interlayer where the third layer merges therewith.

4. The baffle construct of claim 2 wherein the length/height aspect ratio of the baffle is at least 1, the length being the separation between joints along the X-axis, and the height being the maximum separation of the adjacent layers along the Y-axis.

5. The baffle construct of claim 2 wherein the height/length aspect ratio of the baffle is at least 1, the length being the separation between joints along the X-axis, and the height being the maximum separation of the adjacent layers along the Y-axis.

6. The baffle construct of claim 2 wherein the baffles are aligned on a first level and a second level, the levels being in parallel planes arranged along two levels, and wherein the first level of baffles comprises baffles having a first configuration and the second level of baffles comprises a second configuration in a nested arrangement with the baffles of the first configuration, the baffles in the second configuration each overlying fully multiple baffles in the first configuration.

7. The baffle construct of claim 6 wherein the baffles at one level nest with baffles at the other level.

8. The baffle construct of claim 2 wherein there are at least 5 or more baffles.

9. A baffle construct, comprising:
a drapable, pliable three-layer construction of a first layer, a second interlayer below the first layer, and a third layer below the interlayer, the layers all being part of unitary, seamlessly woven fabric construct, the layers being joined so as to define at least four expandable baffles, the baffles being expandable from a first collapsed configuration to a second expanded configuration;
the baffle construct having a theoretical longitudinal cross-sectional profile such that the first, second, and third layers each have a sinusoidal form with maxima or peaks and minima or troughs, with the first layer and third layer generally being in phase with each other, and the interlayer being out of phase by about 180 degrees;
for the first and third layers, the minima or troughs of the first layer merging with maxima or peaks of the interlayer to form joints, and the maxima or peaks of the third layer merging with minima or troughs of the interlayer to form joints; and
wherein the first, second, and third layers are disconnected between the joints so as to define the expandable baffles; and
wherein at least one layer is downproof or fiberproof and one of the interlayers has an overall fabric density that is lower than the overall fabric density of the first and/or the third layers, the first layer and/or the third layer being downproof or fiberproof based on its overall fabric density.

10. A baffle construct of claim 2 further comprising a fill material that expands the baffle towards the theoretical profile, the baffle construct being sealed to contain the fill material.

11. An end product comprising a baffle construct of claim 10, the end product being selected from the group of: garments, sleeping bags, sleeping pads, footwear uppers, gloves, headwear, pillows, cushions, beds, or bed toppings.

12. The baffle construct of claim 2 wherein the layers of material vary from one another or within a given layer in terms of materials, weave types, and/or material properties.

13. The baffle construct of claim 12 wherein at least one layer has varying zones across the warp and/or weft direction, and a transition zone is disposed between zones so as to provide a progressive transition of the attributes of one zone to another.

14. The baffle construct of claim 2 wherein one of the first or third layers comprises a durability zone and the other of the first or third layers comprises a light-weight, breathable, moisture wicking, or comfort fabric layer.

15. A baffle construct, comprising:
a drapable, pliable multilayer construction of a first layer, one or more interlayers, and a third layer, the one or more interlayers being disposed between the first and third layers, the layers all being part of a unitary, seamlessly woven fabric construct, the layers being joined so as to define a plurality of baffles,
the baffles being expandable from a first collapsed configuration to a second expanded configuration, wherein the baffle construct has a flat form when in the first collapsed configuration, with the first layer being adjacent one side of the interlayer and the third layer being adjacent to an opposite side of the interlayer, the layers being disconnected from one another except at spaced apart joints at (i) a top side of the interlayer where the first layer merges therewith and (ii) at a bottom side of the interlayer where the third layer merges therewith; and
wherein the baffle construct has a theoretical longitudinal cross-sectional profile in the second, expanded configuration such that the first, second, and third layers each have an undulating or sinusoidal form with (1) maxima or peaks and (2) minima or troughs, which are configured and arranged so that the baffles are arranged in a nested configuration along two or more levels; and
wherein at least one layer is downproof or fiberproof and one of the interlayers has an overall fabric density that is lower than the overall fabric density of the first and/or the third layers, the first layer and/or the third layer being downproof or fiberproof based on its overall fabric density.

16. The baffle construct of claim 2 wherein the layers being disconnected from one another except at spaced apart joints at (i) a top side of the interlayer where the first layer merges therewith and (ii) at a bottom side of the interlayer where the third layer merges therewith, and the joints each comprising a flat woven section in a horizontal orientation that spaces apart adjacent baffles at the same horizontal level.

17. The baffle construct of claim 2 wherein the baffle construct has a plurality of cross-sectional baffle shapes and/or sizes based on any one or more of the following baffle parameters length, height, cross-sectional area, and volume.

18. The baffle construct of claim 16 wherein the baffle construct has a plurality of joint lengths and/or widths in the horizontal orientation.

19. The baffle construct of claim 2 wherein an elongate flat woven section comprising a closure is disposed in the baffle construct, the closure comprising sections that can separate from one another, thereby dividing multiple rows of baffles into two sections of baffles on either side of the closure, with the closure sections and the baffle sections being seamlessly woven with each other, the closure being suitable for forming an opening in the construct on separation of the separable closure sections.

20. The baffle construct of claim 19 wherein the closure is divided along its length so that it provides an opening in the construct, and a zipper for selectively opening and closing the closure is operably associated with the closure to provide for the opening.

21. A baffle construct, comprising:
a drapable, pliable multilayer construction of a first layer, one or more interlayers, and a third layer, the one or more interlayers being disposed between the first and third layers, the layers all being part of a unitary, seamlessly woven fabric construct, the layers being joined so as to define a plurality of baffles, and
wherein the baffles are expandable from a first collapsed configuration to a second expanded configuration; and
wherein one of the layers has an overall yarn density that varies from the overall yarn density of another layer.

22. A baffle construct, comprising:
a drapable, pliable multilayer construction of a first layer, one or more interlayers, and a third layer, the one or more interlayers being disposed between the first and third layers, the layers all being part of a unitary, seamlessly woven fabric construct, the layers being joined so as to define a plurality of baffles, and wherein the baffles are expandable from a first collapsed configuration to a second expanded configuration; and
wherein one of the layers has a majority or major component of yarn size that varies from that of another layer.

23. The baffle construct of claim 2, wherein one of the layers comprises a majority or major component of a yarn material type that varies from that of another layer.

24. The baffle construct of claim 2 wherein one of the interlayers has an overall fabric density that is lower than the overall fabric density of the first and/or the third layers based on the interlayer having lower denier yarns relative to the first and/or third layers, the first layer and/or the third layer with the lower denier yarns having sufficient density to be downproof.

25. The baffle construct of claim 2 wherein one of the interlayers has a majority or major component of yarn denier size that is higher than that of the first layer and/or the third layer, the first layer and/or the third layer having sufficient density to be downproof.

26. The baffle construct of claim 15 wherein an interlayer comprises a majority or major component of yarns having a different denier than that of one or both of the first and third layers.

27. The baffle construct of claim 15 wherein an interlayer has an overall different density than that of one or both of the first and third layers.

28. A garment comprising one or more baffle constructs according to claim 2 the baffle constructs further comprising fill material disposed in the baffles, the plurality of baffles having differing configurations with a first configuration mapping to a first body area of an intended user and second configuration mapping to a second body area of an intended user, the differences in configuration allowing for different selected functional or performance attributes.

29. The garment of claim 28 wherein the first baffle configuration in a filled condition represents relatively high thermal insulation value and the second baffle configuration in a filled condition represents relatively low thermal insulation value.

30. The garment of claim 29 wherein the baffles corresponding to the second configuration are mapped to a body area that comprises a joint selected from an elbow area joint, shoulder area joint, or knee area joint.

31. The garment of claim 28 wherein the first baffle configuration in a filled condition represents relatively high breathability and the second baffle configuration in a filled condition represents relatively low breathability.

32. A method of making a baffle construct, comprising:
providing a plurality of weft yarns and warp yarns;
weaving a drapable, pliable multilayer construction of a first layer, one or more interlayers, and a third layer, the one or more interlayers being disposed between the first and third layers, the layers all being part of a unitary, seamlessly woven fabric construct, the layers being joined so as to define a plurality of baffles, and wherein the baffles are expandable from a first collapsed configuration to a second expanded configuration, the theoretical longitudinal cross-sectional profile of the baffles in the expanded configuration being an oval-like, elliptical-like, or a quadrilateral-like form; and
wherein at least one layer is downproof or fiberproof one of the interlayers has an overall fabric density that is lower than the overall fabric density of the first and the third layers, the first layer and/or the third layer being downproof or fiberproof based on its overall fabric density.

33. The method of claim 32 wherein one of the interlayers has an overall fabric density that is lower than the overall fabric density of the first and the third layers, the first layer and/or the third layer having sufficient density to be downproof, and further comprising expanding the baffles and filling them with a fill material and sealing the baffles.

34. The method of claim 33 further comprising assembling the baffle construct into an end product selected from the group of: garments, sleeping bags, sleeping pads, footwear uppers, gloves, headwear, pillows, cushions, beds, or bed toppings.

35. A method of making a baffle construct, comprising:
providing a plurality of weft yarns and warp yarns;
weaving a drapable, pliable multilayer construction of a first layer, one or more interlayers, and a third layer, the one or more interlayers being disposed between the first and third layers, the layers all being part of a unitary, seamlessly woven fabric construct, the layers being joined so as to define a plurality of baffles, and wherein the baffles are expandable from a first collapsed configuration to a second expanded configuration; and
wherein at least one layer is downproof or fiberproof one of the interlayers has an overall fabric density that is lower than the overall fabric density of the first and the third layers, the first layer and/or the third layer being downproof or fiberproof based on its overall fabric density.

36. The baffle construct of claim 2 wherein one of the interlayers has a majority or major component of yarn size that is higher than that of the first layer and/or the third layer, the first layer and/or the third layer having sufficient density to be downproof.

37. The baffle construct of claim 2 wherein one of the interlayers has a majority or major component of yarn denier size that is higher than that of the first layer and/or the third layer, the first layer and/or the third layer having sufficient density to be downproof.

38. The baffle construct of claim 26 where the majority or major component of different yarns in the interlayer has a higher denier than the majority of yarns in one or both of the first and third layers.

39. The baffle construct of claim 2 wherein the construct has selectively varying yarn denier, yarn material, and/or fabric density to provide selective breathability, windproofness, waterproofness, thermal insulation, moisture transport, elasticity, abrasion resistance, cut/tear resistance, anti-compression resistance, increased compressibility, or purely aesthetic features in one layer or zone versus another.

40. The baffle construct of claim 2 wherein the construct has selectively placed thermoplastic yarns that are in a fused form.

41. The method of claim 35 wherein the weft or warp yarns include selectively placed thermoplastic yarns, and further comprising placing the construct on a form, mold or pattern and heating and setting the construct to the corresponding shape of the form, mold, or pattern.

42. The method of claim 41 wherein the shape represents an anatomical body part.

* * * * *